(12) United States Patent
Park et al.

(10) Patent No.: US 11,365,380 B2
(45) Date of Patent: Jun. 21, 2022

(54) BEVERAGE MAKER AND METHOD FOR MAKING BEVERAGE

(71) Applicant: LG ELECTRONICS INC., Seoul (KR)

(72) Inventors: Sunyoung Park, Seoul (KR); Wonchul Kang, Seoul (KR); Kyungseok Min, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 477 days.

(21) Appl. No.: 16/192,413

(22) Filed: Nov. 15, 2018

(65) Prior Publication Data

US 2019/0153366 A1 May 23, 2019

(30) Foreign Application Priority Data

Nov. 17, 2017 (KR) .................. 10-2017-0154339

(51) Int. Cl.
| | | |
|---|---|---|
| *C12C 13/10* | (2006.01) | |
| *C12C 11/02* | (2006.01) | |
| *C12C 11/00* | (2006.01) | |
| *C12G 1/036* | (2006.01) | |

(52) U.S. Cl.
CPC ............ *C12C 13/10* (2013.01); *C12C 11/006* (2013.01); *C12C 11/02* (2013.01); *C12G 1/0206* (2013.01)

(58) Field of Classification Search
CPC ....... C12C 13/10; C12C 11/02; C12C 11/006; C12C 13/00; C12C 11/00
See application file for complete search history.

(56) References Cited

U.S. PATENT DOCUMENTS

| | | |
|---|---|---|
| 2010/0323059 A1 | 12/2010 | Wallace |
| 2016/0201018 A1 | 7/2016 | Watson et al. |
| 2017/0335258 A1* | 11/2017 | Chong ................... C12C 13/00 |

FOREIGN PATENT DOCUMENTS

| | | |
|---|---|---|
| CN | 104498246 A | 4/2015 |
| EP | 2173849 B1 | 12/2017 |

* cited by examiner

*Primary Examiner* — Hong T Yoo
(74) *Attorney, Agent, or Firm* — Dentons US LLP

(57) ABSTRACT

A beverage maker apparatus including a fermentation tank having a space in which a beverage is made, a temperature sensor configured to detect a temperature of the fermentation tank, a temperature controller configured to control the temperature of the fermentation tank, and a controller configured to operate when yeast is put into the beverage that is being made so that a fermentation process comprising a pre-fermentation process of controlling the temperature controller on the basis of a first setting temperature and a main-fermentation process of controlling the temperature controller on the basis of a second setting temperature.

13 Claims, 12 Drawing Sheets

BEVERAGE MAKER AND METHOD FOR MAKING BEVERAGE

CROSS-REFERENCE TO RELATED APPLICATION

The present application claims priority under 35 U.S.C. 119 and 35 U.S.C. 365 to Korean Patent Application No. 10-2017-0154339, filed on Nov. 17, 2017, which is hereby incorporated by reference in its entirety.

BACKGROUND

The present disclosure relates to a beverage maker apparatus, and more particularly, to a beverage maker apparatus for making a fermented beverage, such as beer.

Beverages are collectively referred to as drinkable liquids such as alcohol, juice, water, tea, etc. Beer, for example, is an alcoholic beverage produced by making juice of malt, which is made by sprouting barley, filtering the juice, adding hop, and fermenting yeast.

Homemade beer (also referred to as "house beer") is becoming popular—especially because it can be made into a variety of types and tastes.

The ingredients for making beer may include water, liquid malt, hop, yeast, flavor additive, and the like. Yeast, which is called leaven, may be added to liquid malt to ferment the liquid malt and assist production of alcohol and carbonic acid. Flavor additives, such as fruit, syrup, vanilla beans, etc., may be added to change the flavor or enhance the taste of beer.

Generally, the process for making house beer may include three stages, first, a wort production step, second, a fermentation step, and third, an aging step. It may take about two to three weeks from the wort production step to the aging step.

It is important for the house beer to maintain an optimum temperature during fermentation, and for the beer making process to be as convenient as possible. The present invention is directed to such improvements in the beverage maker apparatus and methods for making fermented beverage.

SUMMARY

One objective is to provide a beverage maker in which activation of yeast during a fermentation process is promoted in order to more effectively realize the fermentation of the beverage.

According to an embodiment, a beverage maker includes: a fermentation tank having a space in which a beverage is made; a temperature sensor configured to detect a temperature of the fermentation tank; a temperature controller configured to control the temperature of the fermentation tank; and a controller configured to operate when yeast is put into the beverage that is being made so that a fermentation process comprising a pre-fermentation process of controlling the temperature controller on the basis of a first set temperature and a main-fermentation process of controlling the temperature controller on the basis of a second set temperature.

The first set temperature may be higher than the second set temperature.

The controller may include a timer configured to measure a pre-fermentation progress time when the pre-fermentation process is performed, and when the pre-fermentation progress time exceeds the pre-fermentation set time, the main-fermentation process may be performed.

The temperature controller may include: a heater for raising the temperature of the fermentation tank; and a refrigerant cycle device for lowering the temperature of the fermentation tank.

In the pre-fermentation process, the controller may be configured to drive the heater when the temperature of the fermentation tank, which is detected through the temperature sensor, is less than a lower limit value of the first set temperature, and the controller may be configured to drive the refrigerant cycle device when the temperature of the fermentation tank is greater than an upper limit value of the first set temperature.

In the main-fermentation process, the controller may be configured to drive the heater when the temperature of the fermentation tank, which is detected through the temperature sensor, is less than a lower limit value of the second set temperature, and the controller may be configured to drive the refrigerant cycle device when the temperature of the fermentation tank is greater than an upper limit value of the second set temperature.

The beverage maker may further include a gas discharger configured to control a pressure within the fermentation tank, wherein the gas discharger may include: a gas pressure sensor configured to measure the pressure within the fermentation tank; and a gas discharge valve configured to open and close a gas discharge channel connected to the fermentation tank.

In the pre-fermentation process, the controller may be configured to open the gas discharge valve.

The main-fermentation process may include a first main-fermentation process and a second main-fermentation process, and a pressure within the fermentation tank in the second main-fermentation process may be greater than a pressure within the fermentation tank in the first main-fermentation process.

The gas discharge valve may be in an opened state when the first main-fermentation process is performed, and the controller may operate to repeatedly perform opening and closing operations of the gas discharge valve when a progress time of the first man-fermentation process exceeds a predetermined time, measure a pressure within the fermentation tank by using the gas pressure sensor when the gas discharge valve is opened, and operate to perform the second main-fermentation process when the measured pressure reaches a first main-fermentation set pressure.

The controller may operate to close the gas discharge valve when the second main-fermentation process is performed, measure a pressure within the fermentation tank by using the gas pressure sensor, open the gas discharge valve when the measured pressure is greater than an upper limit value of a second main-fermentation set pressure, and close the gas discharge valve when the measured pressure is less than a lower limit value of the second main-fermentation set pressure.

The controller may operate to end the second main-fermentation process when a variation in pressure within the fermentation tank, which is measured by the gas pressure sensor, per unit time is less than a reference variation.

In the pre-fermentation process, the controller may operate to close the gas discharge valve, measure the pressure within the fermentation tank by using the gas pressure sensor, calculate a variation in pressure by measuring the pressure within the fermentation tank after a predetermined time elapses, and end the pre-fermentation process when the calculated pressure variation is greater than a reference value.

The beverage maker may further include: a water supply module configured to supply water to the fermentation tank; and an ingredient feeder disposed between the water supply module and the fermentation tank to accommodate the yeast.

According to another embodiment, a method for making a beverage in a beverage maker includes: putting yeast into the beverage that is being made within a fermentation tank of the beverage maker; performing a pre-fermentation operation for controlling a temperature controller that controls a temperature of the fermentation tank on the basis of a pre-fermentation set temperature when the yeast is put; and performing a main-fermentation operation for controlling the temperature controller on the basis of a main-fermentation set temperature.

BRIEF DESCRIPTION OF THE DRAWINGS

To achieve the foregoing objects, and in accordance with the purpose of the invention as embodied and broadly described herein

DETAILED DESCRIPTION OF THE EMBODIMENTS

Figure 1:
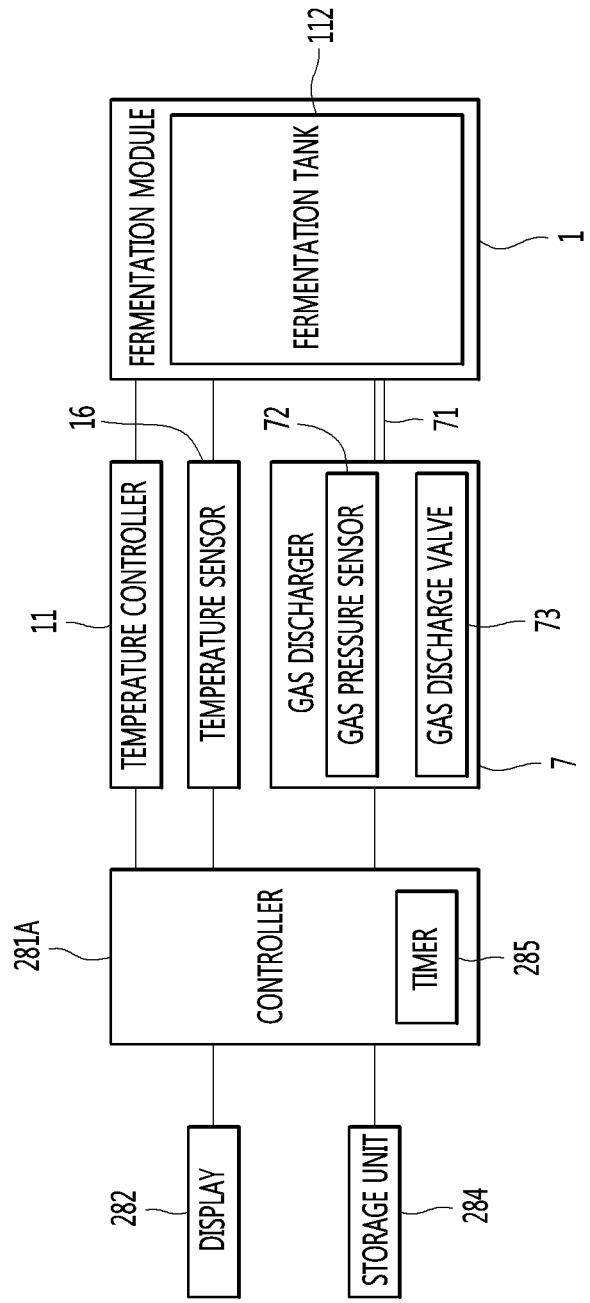
FIG. 1 is a schematic view illustrating a configuration of a beverage maker according to an embodiment of the present invention.

Hereinafter, detailed embodiments of the present invention will be described in detail with reference to the accompanying drawings. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be added in subsequent filings along with figures, but they are not required to understand the present disclosure. The inventors assert and exercise their right to their own lexicography. Quoted terms are defined explicitly, but quotation marks are not used when a term is defined implicitly. Terms may be defined, either explicitly or implicitly, here in the Detailed Description of the Preferred Embodiments and/or elsewhere in the application file.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, features described with respect to certain embodiments may be combined in or with various other embodiments in any permutational or combinatory manner. Different aspects or elements of example embodiments, as disclosed herein, may be combined in a similar manner.

The term "combination", "combinatory," or "combinations thereof" as used herein refers to all permutations and combinations of listed items preceding that term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. A skilled artisan will understand that typically there is no limit on a number of items or terms in any combination, unless otherwise apparent from the context.

Similarly, as used herein, various singular forms "a," "an" and "the" are intended to include various plural forms as well, unless context clearly indicates otherwise. For example, a term "a" or "an" shall mean "one or more," even though a phrase "one or more" is also used herein.

Moreover, terms "comprises," "includes" or "comprising," "including" when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

Additionally, although terms first, second, and others can be used herein to describe various elements, components, regions, layers, or sections, these elements, components, regions, layers, or sections should not necessarily be limited by such terms. Rather, these terms are used to distinguish one element, component, region, layer, or section from another element, component, region, layer, or section. As such, a first element, component, region, layer, or section discussed below could be termed a second element, component, region, layer, or section without departing from this disclosure.

Words such as "then," "next," etc. are not intended to limit the order of the steps; these words are simply used to guide the reader through the description of the methods.

Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Although the embodiments disclosed herein mostly describe beer as being the exemplary beverage made using a beverage maker, it is understood that the type of beverages is not limited to beer and can apply to any other beverage that is capable of being made by using the beverage maker.

FIG. 1 is a schematic view illustrating a configuration of a beverage maker according to an embodiment of the present invention. Referring to FIG. 1, a beverage maker may represent a device for making a beverage through a process involving mixing, fermentation, and aging.

The beverage maker may include a fermentation module 1, a temperature controller 11, a temperature sensor 16, a gas discharger 7, a controller 281A, and a storage unit 284.

The fermentation module 1 may be formed having a space in which in which a beverage is made. The ingredients for making the beverage may be inserted or provided in the space and then mixed or fermented to make a beverage. The fermentation module 1 may include a fermentation tank 112 defining the space in which the beverage is made, and a lid for opening and closing the fermentation tank 112. The fermentation module 1 according to an embodiment will be described in more detail below with reference to FIGS. 2 to 4.

The temperature controller 11 may be configured to control a temperature within the fermentation module 1, particularly, a temperature of the fermentation tank 112 on the basis of a temperature set according to a process for making the beverage. For example, the temperature controller 11 may include a refrigerant cycle device (see reference numeral 13 of FIG. 8) for lowering a temperature of the fermentation tank 112 and a heater (see reference numeral 14 of FIG. 8) for increasing the temperature of the fermentation tank 112. At least a portion of the temperature controller 11 may contact the fermentation tank 112 to control the temperature of the fermentation tank, but the configuration is not limited thereto.

The controller 281A may be configured to detect the temperature of the fermentation tank 112 by using a temperature sensor 16 and control an operation the temperature controller based at least in part on the detected temperature. Also, at least a portion of the temperature sensor 16 may contact the fermentation tank 112 to control the temperature of the fermentation tank, but the configuration is not limited thereto.

The gas discharger 7 may control a pressure within the fermentation module 1, particularly, a pressure within the fermentation tank 112. For example, the gas discharger 7 may be connected to the fermentation module 1 through a gas discharge channel 71. The gas discharger 7 may include a gas pressure sensor 72 for measuring a pressure of the fermentation tank 112 and a gas discharge valve 73 for opening and closing the gas discharge channel 71 between the fermentation tank 112 and the outside.

For example, the controller 281A may detect a pressure within the fermentation tank 112 by using the gas pressure sensor 72 and control a turn on/off operation of the gas discharge valve 73 based on the detected pressure. When the gas discharge valve 73 is in a turned on state, the gas discharge channel 71 may be opened to discharge a gas within the fermentation tank 112 to the outside. When the gas discharge valve 73 is in a turned off state, the gas discharge channel 71 may be closed.

The controller 281A may be configured to control an operation of each of component provided in the beverage maker for making the beverage. For example, the controller 281A may control the temperature controller 11 based on the temperature detected from the temperature sensor 16, or control the gas discharge valve 73 based on the pressure detected from the gas input sensor 72.

The controller 281A may be implemented in hardware as at least one of application specific integrated circuits (ASICs), digital signal processors (DSPs), field programmable gate arrays (FPGAs), microcomputers, CPUs, application processors, and other electrical units.

According to an embodiment, the controller 281A may include a timer 285 for measuring a progressing time in a specific making process during the making of the beverage.

The storage unit 284 (e.g., memory), which may work with in tandem with the controller 281A, may be configured to store control information for controlling the components of the beverage maker or store various pieces of information related to the making of the beverage. The information related to the making of the beverage may include, for example, set values such as a temperature, a pressure, a time, and the like according to the type of beverage that is to be made.

The beverage maker may further include a display 282, which may work with in tandem with the controller 281A, providing information related to a state of the beverage, a making process, a state of the beverage maker during the making of the beverage, etc.

According to an embodiment, the beverage maker may include an ingredient supply module (see reference numeral 3 in FIG. 2) for accommodating at least a portion of the ingredients required for making the beverage and automatically or manually putting the accommodated ingredients into the fermentation module 1.

According to an embodiment, the beverage maker may further include a water supply module (see reference numeral 5 in FIG. 2) for supplying water for making the beverage into the fermentation module 1 and an air injector (see reference numeral 8 in FIG. 2) for injecting air into the fermentation module 1. In this case, a channel through which water or air passes may be provided between the water supply module and the fermentation module 1 or between the air injector and the fermentation module 1.

Hereinafter, an overall configuration of the beverage maker according to an embodiment of the invention will be described in detail with reference to FIGS. 2 to 5.

Figure 2:
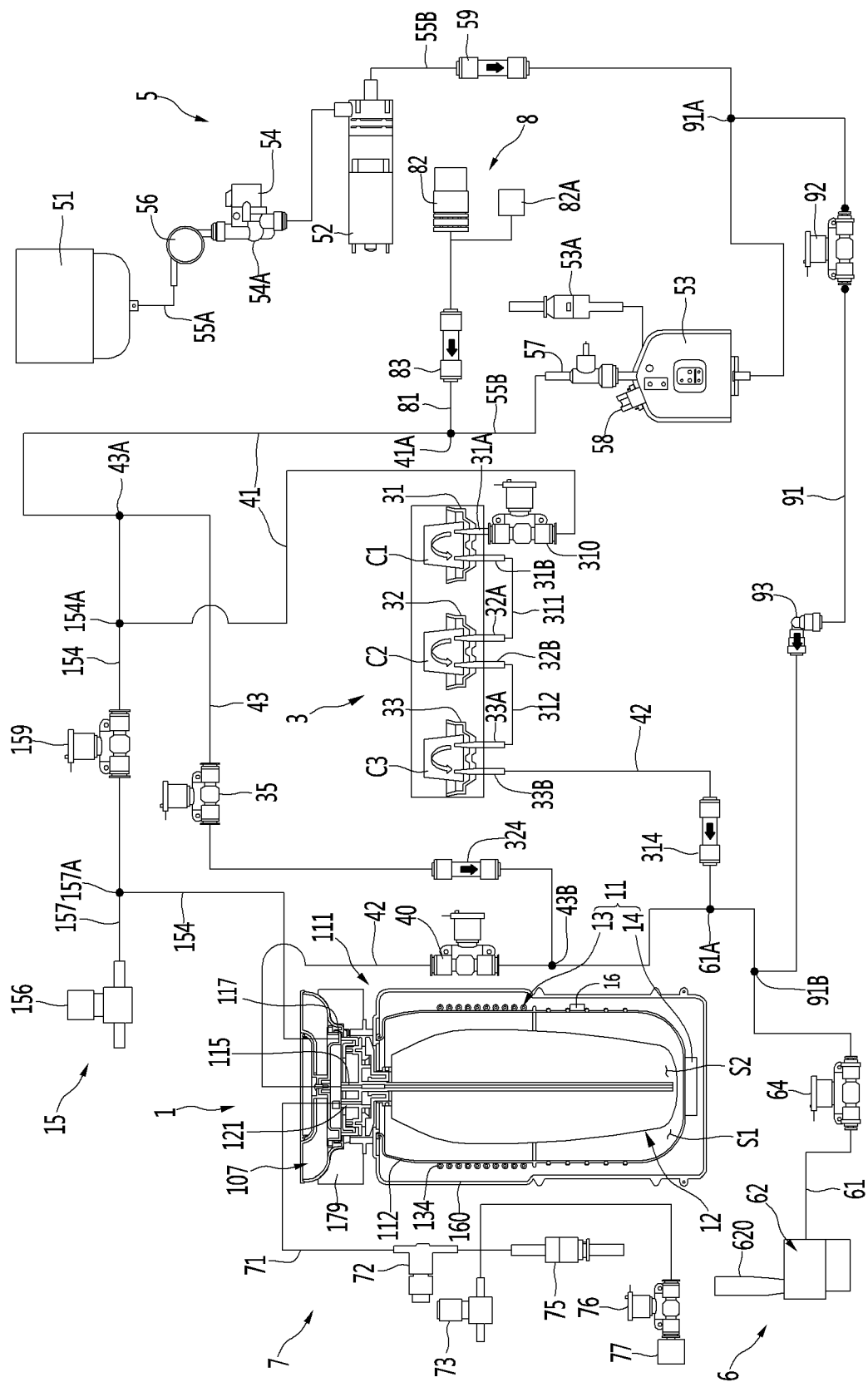
FIG. 2 is a view illustrating an overall configuration of the beverage maker of FIG. 1 according to an embodiment of the present invention.

FIG. 2 is a view illustrating an example of an overall configuration of the beverage maker of FIG. 1 according to an embodiment of the invention.

Looking at FIG. 2, the beverage maker may include a fermentation module 1, a temperature controller that controls an inner temperature of the fermentation module 1, a water supply module 5 that may supply water, an ingredient supply module 3 provided with ingredient accommodating parts 31, 32, and 33 in which ingredients required for making the beverage are accommodated.

The beverage maker may include main channels 41 and 42 connecting the water supply module 5 to the fermentation module 1.

The beverage maker may include a beverage dispenser 6 for dispensing the beverage made in the fermentation module 1 to the outside of the beverage maker.

The beverage dispenser 6 may be connected to a second main channel 42. Thus, the beverage dispensed from the fermentation module 1 may be guided to the beverage dispenser 6 by passing through a portion of the second main channel 42.

The beverage maker may further include a gas discharger 7. The gas discharger 7 may be connected to the fermentation module 1 to discharge gas generated while the beverage is made.

The beverage maker may further include an air injector 8 for injecting air. The air injector 8 may be connected to the water supply module 5 or a first main channel 41. The air injector 8 may include an air pump 82.

The beverage maker may further include an air controller 15 controlling a pressure between an inner wall of a fermentation tank 112 and an outer surface of a fermentation container 12.

The beverage maker may further include a sub channel 91. The sub channel 91 may connect the water supply module 5 to the beverage dispenser 6.

Hereinafter, the fermentation module 1 will be described in detail according to an exemplary embodiment.

The fermentation module 1 may include a fermentation tank module 111 having an opening (see reference numeral 170 of FIG. 4) and a fermentation lid 107 for opening and closing the opening 170.

The fermentation tank module 111 may include a fermentation case 160 and a fermentation tank 112 accommodated in the fermentation case 160 and having an inner space S1 between the inner wall of the fermentation tank 112 and an outer surface of a fermentation container 12. The insulation part (not shown) may be provided between the fermentation case 160 and the fermentation tank 112. The fermentation tank module 111 may further include a lid seating body 179 on top of which the fermentation lid 107 is set.

Each of the fermentation case 160 and the fermentation tank 112 may be provided as an assembly of a plurality of members. The fermentation case 160 may define an outer or external appearance of the fermentation tank module 111.

The fermentation lid 107 may seal the inside of the fermentation tank module 111 and be disposed on the fermentation tank module 111 to cover the opening 170. A main channel, particularly, a main channel connecting portion 115 connected to a second main channel 42 may be provided in the fermentation lid 107.

A fermentation container 12 may be accommodated in the fermentation tank 112. The fermentation container 12 may be provided as a separate container so that the beverage ingredients and the made beverage do not stain an inner wall of the fermentation tank 112. The fermentation container 12 may be separably disposed on the fermentation tank 112. The fermentation container 12 may be disposed on the fermentation tank 112 to ferment the beverage within the fermentation tank 112. After the fermentation container 12 is used, the fermentation container 12 may be removed and withdrawn to the outside of the fermentation tank 112.

The fermentation container 12 may be a package containing the ingredients for making the beverage. The fermentation container 12 may be made of a flexible material. Thus, the fermentation container 12 may be easily inserted into the fermentation tank 112 and be contracted and expanded by a pressure. However, this embodiment is not limited thereto. For example, the fermentation container 12 may be made of a PET material or the like.

The fermentation container 12 may have a beverage making space S2 in which the beverage ingredients are accommodated, and the beverage is made. The fermentation container 12 may have a size less than that of the inner space S1 of the fermentation tank 112 so that it can be accommodated therein.

The fermentation container 12 may be inserted and accommodated inside the fermentation tank 112 in the state in which the ingredients are contained in the fermentation container 12. The fermentation container 12 may also be inserted and accommodated inside the fermentation tank 112 in the state in which the fermentation lid 107 is open.

The fermentation lid 107 may seal the fermentation tank 112 after the fermentation container 12 is inserted into the fermentation tank 112. The fermentation container 12 may assist the fermentation of the ingredient in the state in which the fermentation container 12 is accommodated in the space S1 that is sealed by the fermentation container 112 and the fermentation lid 107. The fermentation container 12 may be expanded by the pressure therein during the making of the beverage. The fermentation container 12 may be pressed by the air within the fermentation tank 112 when the beverage contained in the fermentation container 12 is dispensed, and the air is supplied between an inner surface of the fermentation tank 112 and the fermentation container 12.

The fermentation tank 112 may be disposed in the fermentation case 160. The fermentation tank 112 may have an outer circumference surface and a bottom surface, which are each spaced apart from the inner surface of the fermentation case 160. In more detail, as shown in FIG. 2, the outer circumference the fermentation tank 112 may be spaced apart from an inner circumference of the fermentation case 160, and an outer bottom surface of the fermentation tank 112 may be spaced apart from an inner bottom surface of the fermentation case 160.

The insulation part (not shown) may be provided between the fermentation case 160 and the fermentation tank 112. The insulation part may be disposed in the fermentation case 160 and surround the fermentation tank 112. Thus, the temperature of the fermentation tank 112 may be constantly maintained.

The insulation part may be made of a material such as foamed polystyrene or polyurethane which has high thermal insulating performance and absorbs vibration, but is not limited to such materials.

The fermentation tank 112 may include a temperature sensor 16 for measuring the temperature of the inner fermentation tank 112. The temperature sensor 16 may be mounted on a circumferential surface of the fermentation tank 112. The temperature sensor 16 may be disposed below an evaporator 134 wound around the fermentation tank 112.

Hereinafter, the temperature controller 11 will be described in detail according to an exemplary embodiment.

The temperature controller 11 may control an inner temperature of the fermentation tank module 111. In more detail, the temperature controller 11 may change a temperature (increase or decrease the temperature) of the fermentation tank 112.

The temperature controller 11 may heat or cool the fermentation tank 112 to control a temperature of the fermentation tank 112 at an optimal temperature for fermenting the beverage. The optimal temperature may be different depending on the type of beverage.

The temperature controller 11 may include at least one of a refrigerant cycle device 13 and a heater 14. However, this embodiment is not limited thereto. For example, the temperature controller 11 may include a thermoelement TEM.

The refrigerant cycle device 13 may control the fermentation tank 112 to adjust a temperature of the fermentation tank 112. The refrigerant cycle device 13 may include a compressor, a condenser, an expansion mechanism, and an evaporator 134.

The evaporator 134 may be disposed to contact an outer surface of the fermentation tank 112. The evaporator 134 may be provided as an evaporation tube wound around an outer surface of the fermentation tank 112. The evaporator 134 may be accommodated between the fermentation tank 112 and the insulation part to cool the fermentation tank 112 that is insulated by the insulation part.

The temperature controller 11 may further include a heater 14 heating the fermentation tank 112. The heater 14 may be disposed to be in contact with the bottom surface of the fermentation tank 112. The heater 14 may be provided as a heat generation heater that generates heat when power is applied. The heater 14 may be provided as a plate heater, but is not limited thereto.

Thus, the natural convection of a fluid may be generated inside the fermentation tank 112 by the evaporator 134 and the heater 14, and temperature distribution inside the fermentation tank 112 and the fermentation container 12 may be uniform or constant.

Hereinafter, the main channels 41 and 42 and a bypass channel 43 will be described according to an embodiment of the invention.

As described above, the main channels 41 and 42 may include a first main channel 41 connecting the water supply module 5 to the ingredient supplier 3 and a second main channel 42 connecting the ingredient supply module 3 to the fermentation module 1.

That is, the first main channel 41 may guide water supplied from the water supply module 5 to the ingredient supply module 3, and the second main channel 42 may guide the mixture of the ingredients and the water, which are extracted from the ingredient supply module 3, to the fermentation module 1.

The first main channel 41 may have one end 41A connected to the water supply module 5 and the other end connected to the ingredient supply module 3, more particularly, an inlet of an initial ingredient accommodating part 31, which will be described below in more detail.

An ingredient supply valve 310 opening and closing the first main channel 41 may be installed in the first main channel 41. The ingredient supply valve 310 may be provided in the ingredient supply module 3.

The ingredient supply valve 310 may be opened in order to open the first main channel 41 when additives accommodated in the ingredient accommodating parts 31, 32, and 33 are put therein. The ingredient supply valve 310 may also be opened when the ingredient accommodating parts 31, 32, and 33 are cleaned to open the first main channel 41.

The second main channel 42 may have one end connected to a main channel connecting portion 115 of the fermentation module 1 and the other end connected to the ingredient supply module 3, more particularly, an outlet 33B of a final ingredient accommodating part 33, which will be described below in more detail.

A main valve 40 for opening and closing the second main channel 42 may be installed in the second main channel 42. Also, a main check valve 314 for allowing the fluid to flow from the ingredient supply module 3 to the fermentation module 1 may be installed in the second main channel 42. The main check valve 314 may function to prevent the fluid from flowing back to the ingredient supply module 3.

The main check valve 314 may be disposed between the main valve 40 and the ingredient supply module 3 with respect to the second main channel 42.

The main valve 40 may be opened when the water is supplied to the fermentation container 12 to open the second main channel 42. The main valve 40 may be closed while the fermentation tank 112 is cooled to close the second main channel 42. The main valve 40 may be opened when the air is injected into the fermentation container 12 to open the second main channel 42. The main valve 40 may be opened when the additives are supplied into the fermentation container 1 to open the second main channel 42. The main valve 40 may be closed to seal the inside of the fermentation container 12 during the fermentation of the ingredients. The main valve 40 may be closed to seal the inside of the fermentation container 12 when the beverage is aged and stored. The main valve 40 may be opened when the beverage is dispensed by the beverage dispenser 6 to open the second main channel 42. The beverage within the fermentation container 1 may pass through the main valve 40 to flow to the beverage dispenser 6.

The first and second main channels 41 and 42 may be provided as a single continuous channel when the beverage maker does not include the ingredient supply module 3.

When the beverage maker includes the ingredient supply module 3, the beverage maker may further include a bypass channel configured to allow the water or the air to bypass the ingredient accommodating parts 31 and 32.

The bypass channel 43 may bypass the ingredient accommodating parts 31, 32, and 33 and then be connected to the first main channel 41 and the second main channel 42.

The bypass channel 43 may have one end connected to the first main channel 41 and the other end connected to the second main channel 42. In more detail, the bypass channel 43 may have one end 43A connected to the first main channel 41 between the water supply module 5 and the ingredient supply valve 310 and the other end 43B connected to the second main channel 42 between the main valve 40 and the ingredient supply module 3.

A bypass valve 35 for opening and closing the bypass channel 43 may be installed in the bypass channel 43. The bypass valve 35 may be opened when the water supplied from the water supply module 5 is supplied to the fermentation container 12 to open the bypass channel 43. The bypass valve 35 may be opened when the air injected from the air injector 8 is supplied to the fermentation container 12 to open the bypass channel 43. The bypass valve 35 may be opened when the bypass channel 43 is cleaned to open the bypass channel 43.

Also, a bypass check valve 324 allowing the fluid to flow from the first main channel 41 to the second main channel 42 may be installed in the bypass channel 43. That is, the fluid may flow only from the first main channel 41 to the second main channel 42 but may not flow in the opposite direction.

The bypass check valve 324 may be disposed between the bypass valve 35 and the second main channel 42 with respect to the bypass channel 43.

Hereinafter, the ingredient supply module 3 will be described in detail according to an exemplary embodiment.

When beer is made by using the beverage maker, the ingredients for making the beer may include water, malt, yeast, hop, flavouring additives, and the like.

The beverage maker may include the ingredient supply module 3 and the fermentation container 12. The ingredients for making the beverage may be accommodated to be divided into the ingredient supply module 3 and fermentation container 12. More particularly, a portion of the ingredients for making the beverage may be accommodated in the fermentation container 12, and the remaining ingredients may be accommodated in the ingredient supply module 3. The ingredients accommodated in the ingredient supply module 3 may be supplied to the fermentation container 12 together with the water supplied from the water supply module 5 and mixed with the portion of the ingredients accommodated in the fermentation container 12.

For example, a main ingredient that is essential for making the beverage may be accommodated in the fermentation container 12, and the additives added to the main ingredient may be accommodated in the ingredient supply module 3. In this case, the additives accommodated in the ingredient supply module 3 may be mixed with the water supplied from the water supply module 5 and supplied to the fermentation container 12 and then be mixed with the main ingredient accommodated in the fermentation container 12.

For example, when the beer is made, the ingredients may be the malt of the malt, the yeast, the hop, and the flavouring additives. Also, the additive accommodated in the ingredient supply module 3 may be the ingredients except for the malt of the ingredient for making the beer, such as, for example, the yeast, the hop, and the flavouring additives.

The beverage maker may not include the fermentation container 12 but not the ingredient supply module 3. In this case, the main ingredients may be accommodated in the fermentation container 12, and the user may directly insert the additives into the fermentation container 12.

Of course, if the beverage maker includes the ingredient supply module 3 and the fermentation container 12, then the beverage may be more conveniently made. Hereinafter, the case in which the beverage maker includes the ingredient supply module 3 and the fermentation container 12 will be described as an example. However, this embodiment is not limited to the case in which the beverage maker includes both the ingredient supply module 3 and the fermentation container 12.

The ingredients within the fermentation container 12 may be fermented as time elapses, and the beverage made in the fermentation container 12 may flow to the second main channel 42 through the main channel connecting portion 115 and also flow from the second main channel 42 to the beverage dispenser 6 so as to be dispensed.

The ingredients that are necessary for making the beverage may be accommodated in the ingredient supply module 3, and the water supplied from the water supply module 5 may pass through ingredient supply module 3. For example, when the beverage made in the beverage maker is beer, the ingredients accommodated in the ingredient supply module 3 may be yeast, hop, flavouring additives, and the like.

The ingredients accommodated in the ingredient supply module 3 may be directly accommodated into an ingredient accommodating parts 31, 32, and 33 provided in the ingredient supply module 3. At least one ingredient accommodating part 31, 32, and 33 may be provided in the ingredient supply module 3. The plurality of ingredient accommodating parts 31, 32, and 33 may be provided in the ingredient supply module 3. In this case, the ingredient accommodating parts 31, 32, and 33 may be partitioned with respect to each other.

Inlets 31A, 32A, and 33A through which the fluid is introduced and outlets 31B, 32B, and 33B through which the fluid is discharged may be provided in the ingredient accommodating parts 31, 32, and 33, respectively. The fluid introduced into the inlet of one ingredient accommodating part may be mixed with the ingredients within the ingredient accommodating parts and then discharged through the outlet.

The ingredients accommodated in the ingredient supply module 3 may be accommodated in capsules C1, C2, and C3. In this case, the capsules C1, C2, and C3 may be accommodated in the ingredient accommodating parts 31, 32, and 33, and each of the ingredient accommodating parts 31, 32, and 33 may be called a capsule mounting part.

When the ingredients are accommodated in the capsules C1, C2, and C3, the ingredient supply module 3 may be configured so that the capsules C1, C2, and C3 are seated and withdrawn. The ingredient supply module 3 may be provided as a capsule kit assembly in which the capsules C1, C2, and C3 are separably accommodated.

For example, a first additive, a second additive, and a third additive may be accommodated in the ingredient supply module 3. The first additive may be yeast, the second additive may be hop, and the third additive may be a flavouring additive. The ingredient supply module 3 may include a first capsule mounting part 31 in which a first capsule C1 containing the first additive is accommodated, a second capsule mounting part 32 in which a second capsule C2 containing the second additive is accommodated, and a third capsule mounting part 33 in which a third capsule C3 containing the third additive is accommodated.

The ingredients contained in the ingredient accommodating part or the capsules C1, C2, and C3 may be extracted by a water pressure of the water supplied from the water supply module 5.

When the ingredients are extracted by the water pressure, the water supplied from the water supply module 5 to the first main channel 41 may pass through the ingredient accommodating part or the capsules C1, C2, and C3 and then be mixed with the ingredients, and the ingredients accommodated in the ingredient accommodating part or the capsules C1, C2, and C3 may flow to the second main channel together with the water.

A plurality of additives different from each other may be accommodated to be divided in the ingredient supply module 3. For example, when the beer is made, the plurality of additives accommodated in the ingredient supply module 3 may be the yeast, the hop, and the flavouring additive, which are accommodated to be divided from each other.

When the plurality of ingredient accommodating parts are provided in the ingredient supply module 3, the plurality of ingredient accommodating parts 31, 32, and 33 may be connected in series to each other in a flow direction of the water.

In more detail, the ingredient supply module 3 may include at least one connecting channel 311 and 312 connecting the outlet of one ingredient accommodating part of the plurality of ingredient accommodating parts 31, 32, and 33 to the inlet of the other ingredient accommodating part.

Also, the plurality of ingredient accommodating parts 31, 32, and 33 may include an initial ingredient accommodating part 31 and a final ingredient accommodating part 33. The plurality of ingredient accommodating parts 31, 32, and 33 may further include an intermediate ingredient accommodating part 32.

The inlet 31A of the initial ingredient accommodating part 31 may be connected to the first main channel 41, and the outlet 33B of the final ingredient accommodating part 33 may be connected to the second main channel 42.

The intermediate ingredient accommodating part 32 may be disposed between the first ingredient accommodating part 31 and the second ingredient accommodating part 33 in the flow direction of the fluid. The inlet 32A and the outlet 32B of the intermediate ingredient accommodating part 32 may be connected to the connecting channels 311 and 312 different from each other.

As illustrated in FIG. 2, when three ingredient accommodating parts are provided in the ingredient supply module 3, the outlet 31B of the final ingredient accommodating part 31 may be connected to the inlet 32A of the intermediate ingredient accommodating part 32 through the first connecting channel 311, and the outlet 32B of the intermediate ingredient accommodating part 32 may be connected to the inlet 33A of the final ingredient accommodating part 33 through the second connecting channel 312.

In this case, the water introduced into the inlet 31A of the final ingredient accommodating part 31 through the first main channel 41 may flow to the first connecting channel 311 through the outlet 31B together with the first additive accommodated in the initial ingredient accommodating part 31.

The fluid (the mixture of the water and the first additive) introduced into the inlet 32A of the intermediate ingredient accommodating part 32 through the first main channel 311 may flow to the second connecting channel 312 through the outlet 32B together with the second additive accommodated in the intermediate ingredient accommodating part 32.

The fluid (the mixture of the water and the first and second additives) introduced into the inlet 33A of the final ingredient accommodating part 33 through the second main channel 312 may flow to the second connecting channel 42 through the outlet 33B together with the third additive accommodated in the final ingredient accommodating part 33.

The fluid (the mixture of the water and the first, second, and third additives) discharged through the second main channel 42 may be guided to the main channel connecting portion 115 of the fermentation module 1 and then introduced into the fermentation container 12.

However, the configuration of the ingredient supply module 3 is not limited thereto. For example, when the intermediate ingredient accommodating part is not provided, two ingredient accommodating parts may be provided in the ingredient supply module 3. In this case, one ingredient accommodating part may be the initial ingredient accommodating part, and the other ingredient accommodating part may be the final ingredient accommodating part. The outlet of the initial ingredient accommodating part and the inlet of the final ingredient accommodating part may be connected to each other by the connecting channel.

For another example, when the intermediate ingredient accommodating part is provided in plurality, four or more ingredient accommodating parts may be provided in the ingredient supply module 3. In this case, one ingredient accommodating part may be the initial ingredient accommodating part, the other ingredient accommodating part may be the final ingredient accommodating part, and the remaining ingredient accommodating part may be the intermediate ingredient accommodating part. In this case, since the connection between the ingredient accommodating parts is in series, it is easily understood by the person skilled in the art, their detailed descriptions will be omitted.

Since the plurality of ingredient accommodating parts 31, 32, and 33 are connected in series to each other, the channel configuration of the ingredient supply module 3 may be simplified. Also, since the additives contained in the capsules C1, C2, and C3 may be simultaneously extracted, a time taken to extract the additives may decrease. Also, since the user does not have to worry about the mounting order of the capsules C1, C2, and C3, malfunction due to the mounting of the capsules C1, C2, and C3 in erroneous order may not occur. Also, the ingredient supply module 3 may be minimized in water leakage point to improve reliability.

When the ingredients accommodated in the ingredient supply module 3 are accommodated in the capsules C1, C2, and C3, the initial ingredient accommodating part 31 may be called an initial capsule mounting part, the intermediate ingredient accommodating part 32 may be called an intermediate capsule mounting part, and the final ingredient accommodating part 33 may be a final capsule mounting part.

Hereinafter, the water supply module 5 will be described in detail according to an exemplary embodiment.

The water supply module 5 may include a water tank 51, a water supply pump 52 for pumping water within the water tank 51, and a water supply heater 53 for heating the water pumped by the water supply pump 52.

The water supply module 5 may further include the water supply pump 52 for pumping water within the water tank 51 and the water supply heater 53 for heating the water pumped by the water supply pump 52.

The water tank 51 and the water supply pump 52 may be connected to a water tank discharge channel 55A, and the water contained in the water tank 51 may be introduced into the water supply pump 52 through the water tank discharge channel 55A.

The water supply pump 52 and one end of the first main channel 41 may be connected to a water supply channel 55B, and the water discharged from the water supply pump may be guided to the first main channel 41 through the water supply channel 55B.

A flow meter 56 for measuring a flow rate of the water discharged from the water tank 51 may be installed in the water tank discharge channel 55A.

A flow rate control valve 54 for controlling the flow rate of the water discharged from the water tank 51 may be installed in the water tank discharge channel 55A. The flow rate control valve 54 may include a step-in motor, but is not limited thereto.

A thermistor 54A for measuring a temperature of the water discharged from the water tank 51 may be installed in the water tank discharge channel 55A. The thermistor 54A may be built in the flow rate control valve 54.

A water supply check valve 59 for preventing the water from flow back to the water supply pump 52 may be installed in the water supply channel 55B.

The water supply heater 53 may be installed in the water supply channel 55B. The water supply heater 53 may be a mold heater and include a heater case through which the water pumped by the water supply pump 52 passes and a heat generation heater installed in the heater case to heat the water introduced into the heater case.

A thermal fuse 58 for interrupting a circuit to cutoff current applied to the water supply heater 53 when a temperature is high may be installed in the water supply heater 53.

The water supply module 5 may further include a safety valve 53A. The safety valve 53A may communicate with the inside of the heater case of the water supply heater 53. The safety valve 53A may restrict a maximum inner pressure of the heater case. For example, the safety valve 53A may restrict the maximum inner pressure of the heater case to a pressure of approximately 3.0 bar (plus/minus 0.25 bar).

The water supply module 5 may further include a water supply temperature sensor 57 for measuring a temperature of the water passing through the water supply heater 53. The water supply temperature sensor 57 may be installed in the water supply heater 53. Alternatively, the water supply temperature sensor 57 may be disposed at a portion of the water supply channel 55B behind the water supply heater 53 and in the flow direction of the water. The water supply temperature sensor 57 may also be installed in the first main channel 41.

When the water supply pump 52 is driven, the water inside the water tank 51 may be introduced into the water supply pump 52 through the water tank discharge channel 55A, and the water discharged from the water supply pump 52 may be heated in the water supply heater 53 while flowing through the water supply channel 55B and then be guided to the first main channel 41.

Hereinafter, the beverage dispenser 6 will be described according to an embodiment of the invention.

The beverage dispenser 6 may be connected to the second main channel 42. In detail, the beverage dispenser 6 may include a dispenser 62 for dispensing the beverage and a beverage dispensing channel 61 connecting to the dispenser 62 to the second main channel 42.

The beverage dispensing channel 61 may have one end 61A connected between the main check valve 314 and the main valve 40 with respect to the second main channel 42 and the other end connected to the dispenser 62.

A beverage dispensing valve 64 for opening and closing the beverage dispensing channel 61 may be installed in the beverage dispensing channel 61.

The beverage dispensing valve 64 may be opened when the beverage is dispensed to open the beverage dispensing channel 61. The beverage dispensing valve 64 may be opened when residual water is removed to open the beverage dispensing channel 61. The beverage dispensing valve 64 may be opened when the beverage dispenser is cleaned to open the beverage dispensing channel 61.

An anti-foaming part (not shown) may be provided in the beverage dispensing channel 61, and an amount of foam of the beverage flowing from the second main passage 42 to the beverage dispensing channel 61 may be decreased while passing through the anti-foaming part. A mesh structure for filtering the foam may be provided in the anti-foaming part 63.

When the beverage is dispensed, the beverage dispensing valve 64 may be opened. When the beverage is not dispensed, the beverage dispensing valve 64 may be maintained in a closed state.

Hereinafter, the gas discharger 7 will be described in detail according to an exemplary embodiment The gas discharger 7 may be connected to the fermentation module 1 and be configured to discharge a gas generated in the fermentation container 12.

In more detail, the gas discharger 7 may include a gas discharge channel 71 connected to the fermentation module, a gas pressure sensor 72 installed in the gas discharge channel 71, and a gas discharge valve 73 connected behind the gas pressure sensor 72 in the gas discharge channel 71 in the gas discharge direction.

The gas discharge channel 71 may be connected to the fermentation module 1, particularly, the fermentation lid 107. A gas discharge channel connecting portion 121 to which the gas discharge channel 71 may be connected may be provided in the fermentation lid 107.

The gas within the fermentation container 12 may flow into the gas discharge channel 71 and the gas pressure sensor 72 through the gas discharge channel connecting portion 121. The gas pressure sensor 72 may be configured to detect a pressure of the gas discharged to the gas discharge channel 71 through the gas discharge channel connecting portion 121 within the fermentation container 12.

The gas discharge valve 73 may be turned to be opened (open state) when the air is injected into the fermentation container 12 by the air injector 8. The beverage maker may substantially uniformly mix the malt with the water by injecting the air into the fermentation container 12. Here, foam generated in the liquid malt may be discharged from the upper portion of the fermentation container 12 to the outside through the gas discharge channel 71 and the gas discharge valve 73.

The gas discharge valve 73 may be turned on (on state) to detect fermentation during the fermentation process and then tuned off (off state) to be closed.

The gas discharger 7 may further include the safety valve 75 connected to the gas discharge channel 71. The safety valve 75 may be connected behind the gas pressure sensor 71 in the gas discharge channel 71 in the gas discharge direction. The safety valve 75 may restrict a maximum pressure of the fermentation container 12 and the gas discharge channel 71. For example, the safety valve 75 may restrict the maximum pressure of the fermentation container 12 and the gas discharge channel 71 to a pressure of approximately 3.0 bar (plus/minus 0.25 bar).

The gas discharger 7 may further include a pressure release valve 76. The pressure release valve 76 may be connected to the gas discharge channel 71. The pressure release valve 76 and the gas discharge valve 73 may be selectively opened/closed (e.g., on/off state).

The gas discharge channel 71 may be branched to be respectively connected to the gas discharge valve 73 and the pressure release valve 76.

A noise reducing device 77 may be mounted on the pressure release valve 76 to reduce noise emitting therefrom. The noise reducing device 77 may include at least one of an orifice structure and a muffler structure.

Even though the pressure release valve 76 is opened, an inner pressure of the fermentation container 12 may gradually decrease by the noise reducing device 77.

As the fermentation process of the beverage progresses, the pressure release valve 76 may be opened to release the pressure when the inner pressure of the fermentation container 12 increases. The noise reducing device 77 may effectively reduce noise generated due to a difference in pressure of the inside and outside of the fermentation container 12.

The pressure release valve 76 may be controlled to be opened/closed (e.g., on/off state) in a secondary fermentation process (S800) that will be described below.

Hereinafter, the air injector 8 will be described according to an embodiment of the present invention. The air injector 8 may be connected to the water supply module 55B or the first main channel 41 to inject air. Hereinafter, for convenience of description, the case in which the air injector 8 is connected to the water supply channel 55B will be described as an example.

The air injector 8 may be connected to an opposite side of a sub channel 91, which will be described later, with respect to the water supply heater 53.

In this case, the air injected into the air injector 8 may pass through the water supply heater 53 to flow to the sub channel 91 together with the residual water within the water supply heater 53. Thus, the residual water within the water supply heater 53 may be removed to maintain a clean state of the water supply heater 53.

Alternatively, the air injected from the air injector 8 to the first main channel 41 may successively pass through the bypass channel 43 and the second main channel 42 and then be injected into the fermentation container 12. Thus, stirring or aeration may be performed in the fermentation container 12.

Alternatively, the air injected from the air injector 8 to the first main channel 41 may be guided to the ingredient supply module 3 to flow to the capsule mounting parts 31, 32, and 33. The residual water or residues within the capsules C1, C2, and C3 or the capsule mounting parts 31, 32, and 33 may flow to the second main channel 42 by the air injected by the air injector 8. The capsules C1, C2, and C3 and the capsule mounting parts 31, 32, and 33 may be cleanly maintained by the air injected by the air injector 8.

The air injector 8 may include an air injection channel connected to the water supply channel 55B or the first main channel 41 and an air pump 82 connected to the air injection channel 81. The air pump 82 may pump the air to the air injection channel 81.

An air injection check valve 83 preventing the water flowing to the water supply channel 55B by the water supply pump from being introduced into the air pump 82 through the air injection channel 81 may be installed in the air injection channel 81.

The air injector 8 may further include an air filter 82A. The air filter 82A may be provided in a suction part of the air pump 82, and thus, external air may be suctioned into the air pump 82 by passing through the air filter 82A. Thus, the air pump 82 may inject clean air into the air injection channel 81.

Hereinafter, the air controller 15 will be described in detail according to an exemplary embodiment. The air controller 15 may be configured to control a pressure between an inner wall of the fermentation tank 112 and an outer surface of the fermentation container 12. The air controller 15 may supply air into a space provided between the outer surface of the fermentation container 12 and the inner wall of the fermentation tank 112. On the other hand, the air controller 15 may exhaust the air within the space between the outer wall of the fermentation container 12 and the inner wall of the fermentation tank 112 to the outside thereof.

The air controller 15 may include an air supply channel 154 connected to the fermentation module 1 and an exhaust channel 157 connected to the air supply channel 154 to exhaust the air to the outside.

The air supply channel 154 may have one end connected to the first main channel 41 and the other end connected to the fermentation module 1.

The air supply channel 154 may be connected to the fermentation module 1, particularly, the fermentation lid 107. An air supply channel connecting portion 117 to which the air supply channel 154 is connected may be provided in the fermentation module 1. The air supply channel connecting portion 117 may communicate with the space between the inner wall of the fermentation tank 112 and the outer surface of the fermentation container 12.

The air injected from the air injector 8 to the first main channel 41 may be guided between the outer surface of the fermentation container 12 and the inner wall of the fermentation tank 112 through the air supply channel 154.

The air injector 8 may function as an air supplier for supplying the air into the space between the fermentation container 12 and the fermentation tank 112 together with the air supply channel 154.

The beverage within the fermentation container 12 may be pressed by the fermentation container 12 that is pushed by the air. When the main valve 40 and the beverage dispensing valve 64 are opened, the beverage may pass through the main channel connecting portion 115 to flow to the second main channel 42. The beverage flowing from the fermentation container 12 to the second main channel 42 may be dispensed to the outside of the beverage maker through the beverage dispenser 6.

The air pump 82 may supply air so that a predetermined pressure occurs between the fermentation container 12 and the fermentation tank 112. Thus, a pressure at which the beverage within the fermentation container 12 is easily dispensed may be occur between the fermentation container 12 and the fermentation tank 112.

The air pump 82 may be maintained in the turn-off state while the beverage is dispensed. When the beverage is completely dispensed, the air pump 82 may be driven for next beverage dispensing and then stopped.

Thus, when the beverage is completely made, the beverage maker may dispense the beverage within the fermentation container 12 to the beverage dispensing channel module 6 in the state in which the fermentation container 1 is disposed within the fermentation module 1 without withdrawing the fermentation container 12 to the outside of the fermentation module 1. Such configuration makes the user's experience more convenient.

The air controller 15 may include a separate air supply pump with respect to the air injector 8. In this case, the air supply channel 154 may be connected to the air supply pump, but may not connected to the first main channel 41. However, the injection of the air into the fermentation container 12 by the air pump 82 and the supplying of the air into the space between the fermentation container 12 and the fermentation tank 112 may be combined with each other to realize a compact product and reduce manufacturing cost.

The exhaust channel 157 may function as an air exhaust passage, through which the air between the fermentation container and the fermentation tank 112 is exhausted to the outside, together with a portion of the air supply channel 154.

The exhaust channel 157 may be disposed outside the fermentation module 1. The exhaust channel 157 may be connected to a portion of the air supply channel 154, which is disposed outside the fermentation tank 112.

The air supply channel 154 may include a first channel connected between a connecting portion 157A connected to the first main channel 41 and the exhaust channel 157 and a second channel connected between the connecting portion 154A connected to the exhaust channel 157 and the air supply channel connecting portion 117. The first channel may be an air supply channel for guiding the air pumped by the air pump 82 to the second channel. Also, the second channel may be an air supply and exhaust-combined channel for supplying the air passing through the air supply channel into the space between the fermentation tank 112 and the fermentation container 12 or guiding the air discharged from the space between the fermentation tank 112 and the fermentation container 12 t the connecting channel 157.

The exhaust channel 157 may be connected to the exhaust valve 156 for opening and closing the exhaust channel 157.

The exhaust valve 156 may be opened so that the air between the fermentation container 12 and the fermentation tank 112 is exhausted to the outside when the fermentation container 12 is expanded while the beverage is made. The exhaust valve 156 may be controlled to be opened (open state) when the water is supplied by the water supply module 5. The exhaust valve 156 may be controlled to be opened (open state) when the air is injected by the air injection channel module 8.

The exhaust valve 156 may be opened so that the air between the fermentation container 12 and the fermentation tank 112 is exhausted when the beverage within the fermentation container 12 is completely dispensed. The user may then remove the fermentation container from the fermentation tank 112 when the beverage is completely dispensed. This is done because safety accidents occur when the inside of the fermentation tank 112 is maintained at a high pressure. Thus, for safety reasons, the exhaust valve 156 may be controlled to be opened when the beverage within the fermentation container 12 is completely dispensed.

The air controller 15 may further include an air supply valve 159 that restricts the air pumped by the air pump 82 and supplied between the fermentation container 12 and the fermentation tank 112.

The air supply valve 159 may be installed in the air supply channel 154. In more detail, the air supply valve 159 may be installed between the connecting portion 154A of the first main channel 41 and the connecting portion 157A of the exhaust channel 157 in the air supply channel 154.

Hereinafter, the sub channel 91 will be described in detail according to an exemplary embodiment.

The sub channel 91 may connect the water supply module 5 to the beverage dispenser 6. In more detail, the sub channel 91 may have one end 91A connected to the water supply channel 55B and the other end 91B connected to the beverage dispensing channel 61.

The sub channel 91 may be connected between the water supply pump 52 and the water supply heater 53 with respect to the water supply channel 55B.

Also, the sub channel 91 may be connected to the connecting portion 61A of the second main channel 42 and the beverage dispensing valve 64 with respect to the beverage dispensing channel 61.

The water supplied by the water supply pump 52 and the air pumped by the air pump 82 may be guided to the beverage dispensing channel 61 through the sub channel 91 and then be dispensed to the dispenser 62. Thus, the residual water or the beverage remaining in the beverage dispenser 6 may be removed.

A sub valve 92 for opening and closing the sub channel 91 may be installed in the sub channel 91.

The sub valve 92 may be opened (open state) when the beverage is dispensed, or when a cleaning operation is performed to open the sub channel 91.

Also, a sub check valve 93 for preventing the beverage of the beverage dispensing channel 61 from flowing back to the water supply module 5 may be installed in the sub channel 91. The sub check valve 93 may be disposed between the sub valve 92 and the beverage dispensing channel 61 with respect to the sub channel 91.

The sub channel 91 may function as a residual water removing channel of the water supply module 5. For example, when the air pump 82 is turned on (on state) in the state in which the air supply valve 159, the bypass valve 35, and the ingredient supply valve 310 are closed (off state), the sub valve 92 is opened and the air injected into the air injection channel 81 may pass through the water supply heater 53 to flow to the sub channel 91. Then, the air may pass through the sub valve 92 to flow to the beverage dispensing channel 61 and then be dispensed to the dispenser 62. In this process, the air may be dispensed together with the water supply module 5, more particularly, the residual water remaining the water supply heater 53 and the water supply channel 55B so that residual water is removed.

Also, the sub channel 91 may function as a cleaning channel. Cleaning processes (S100 and S1100) and a dispenser cleaning process of a beverage dispensing process (S1000) will be described below in detail.

Figure 3:
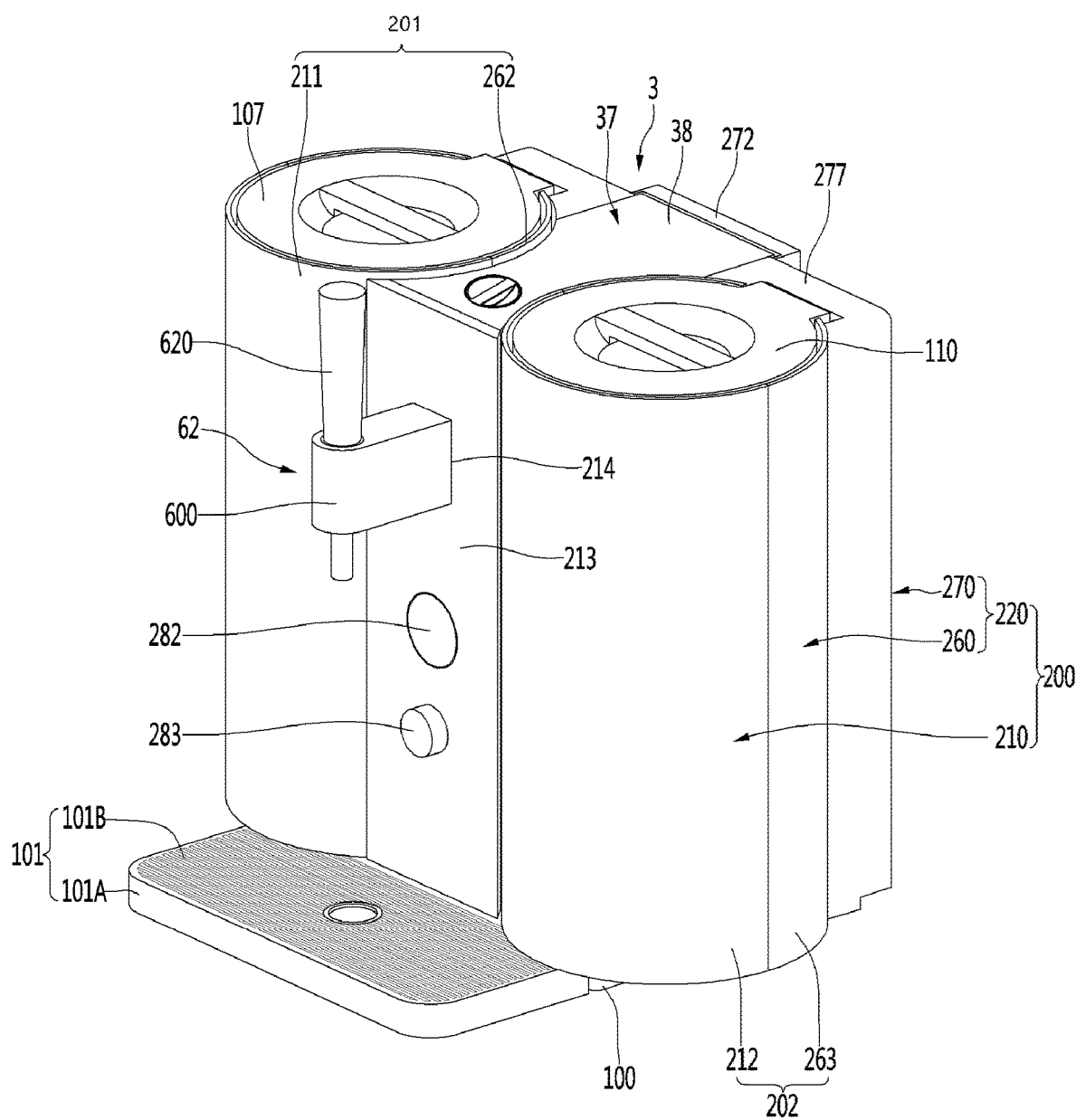
FIG. 3 is a perspective view of the beverage maker of FIG. 1 according to an embodiment of the present invention.
Figure 4:
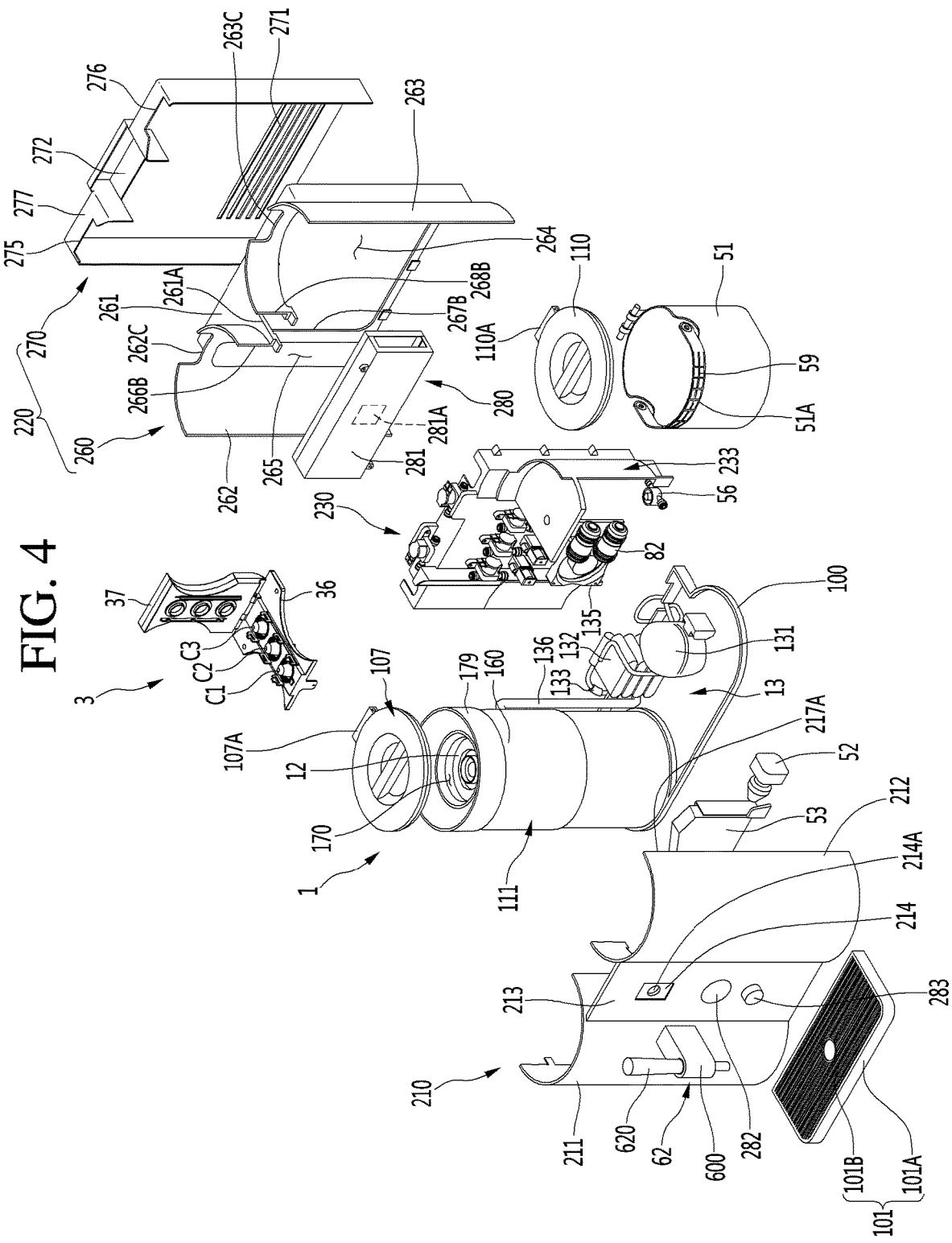
FIG. 4 is an exploded perspective view of the beverage maker of FIG. 3 according to an embodiment of the present invention.

FIG. 3 is a perspective view of the beverage maker of FIG. 1, and FIG. 4 is an exploded perspective view of the beverage maker of FIG. 3.

The beverage maker may include a base 100. The base 100 may define an outer appearance of a bottom surface of the beverage maker and support a fermentation module 1, a refrigerant cycle device 13, a water supply heater 53, and a main frame 230, which are disposed thereon.

The beverage maker may further include a beverage container that receives and stores a beverage dropping from the dispenser 62. The beverage container 101 may be integrated with the base 100 or be coupled to the base 10.

The beverage container 101 may include a container body 101A having a space therein in which the beverage dropping down from the dispenser 62 is accommodated. The beverage container 101 may include a container upper plate 101B disposed on a top surface of the container body 101A to cover the space within the container body 101A.

The container body 101A may protrude forward from a front portion of the base 100. The container body 101A may have an opened top surface, e.g., bottom surface and side walls extending upward from the bottom surface.

A plurality of holes or spaces through which the beverage drop down into the container body 101A may be defined in the container upper plate 101B.

The beverage dropping around the beverage container (not shown) of the beverage dropping down from the dispenser 62 may drop down onto the container upper plate 101B and be temporarily stored in the beverage container 101 through the holes of the container upper plate 101B. Thus, the surrounds of the beverage maker may be cleanly maintained.

The fermentation module 1 may have an approximately cylindrical shape. The fermentation module 1 may be supported by the base 100 at a lower side.

The fermentation module 1 may be disposed on the base 100. Here, the fermentation module 1 may be directly disposed on the base 100 or be supported by a separate fermentation module support (not shown) disposed on the base 100.

The fermentation module 1 may include a fermentation tank module 111 having an opening 170 and a fermentation lid 107 covering the opening 170. As described above, a fermentation container 12 may be accommodated in the fermentation tank module 111.

A fermentation tank 112 may be accommodated in the fermentation case 160. An insulation part may be disposed between the fermentation tank 112 and the fermentation case 160 to insulate the fermentation tank 112. Here, an evaporator (see reference numeral 134 of FIG. 2) and a heater (see reference numeral 14 of FIG. 2) may be disposed between the insulation part and the fermentation tank 112. That is, the insulation part may surround the evaporator 134 and/or the heater 14 together with the fermentation tank 112. Thus, the temperature of the fermentation tank 112 may be easily controlled.

The fermentation lid 107 may be disposed above the fermentation tank module 111 to open and close the opening 170 of the fermentation tank module 111 at an upper side thereof (e.g., at the top of the fermentation tank module 111.

The fermentation tank module 111 may further include a lid seating body 179 on which the fermentation lid 107 is seated. A lid seating body 179 may be disposed above the fermentation case 160 to support the fermentation lid 107 at a lower side thereof.

The fermentation case 160 may constitute an outer appearance of a portion of a lower portion of the fermentation module 1, and the fermentation lid 107 may constitute an outer appearance of a portion of an upper portion (e.g., top) of the fermentation module 1.

The fermentation case 160 may be placed or disposed on the base 100.

The fermentation lid 107 may be separably coupled to the fermentation tank module 111, slidably coupled to the fermentation tank module 111, or rotatably coupled to the fermentation tank module 111. For example, the fermentation lid 107 may be hinge-coupled to the fermentation tank module 111.

The fermentation lid 107 may include a first hinge connecting portion 107A protruding backward relative to the front cover 210 (described below). The first hinge connecting portion 107A may be hinge-coupled to the fermentation tank module 111.

The refrigerant cycle device 13 may include a compressor 131, a condenser 132, an expansion mechanism 133, and an evaporator (see reference numeral 134 of FIG. 2). The beverage maker may further include a blower fan 135 for cooling the condenser 132.

The refrigerant cycle device 13 may include a heat pump. The refrigerant cycle device 13 may include a refrigerant channel switching valve (not shown). The refrigerant channel switching valve may include a four-way valve. The refrigerant channel switching valve may be connected to each of a suction channel of the compressor 131 and a discharge channel of the compressor 131. Also, the refrigerant channel switching valve may be connected to the condenser 132 through the condensation connecting channel and be connected to the evaporator 134 through the evaporator connecting channel.

When the fermentation tank 112 is cooled, the refrigerant channel switching valve may guide a refrigerant compressed in the compressor 131 to the condenser 132 and guide a refrigerant discharged from the evaporator 134 to the compressor 131.

When the fermentation tank 112 is heated, the refrigerant channel switching valve may guide the refrigerant compressed in the compressor 131 to the evaporator 134 and guide the refrigerant discharged from the condenser 132 to the compressor 131.

The base 100 may support at least a portion of the refrigerant cycle device 13. For example, the compressor 131 and the condenser 132 of the refrigerant cycle device 13 may be supported by the base 100.

A pipe 136 may be connected to the fermentation module 1. A portion of a refrigerant pipe constituting the refrigerant cycle device (see reference numeral 13 of FIG. 2) may be formed in the pipe 136. In more detail, a refrigerant pipe connecting the expansion mechanism 133 to the evaporator (see reference numeral 134 of FIG. 2) may be formed in the pipe 136.

The water tank 51 may be disposed above the base 100 and vertically spaced apart from the base 100. The water tank 51 may be vertically spaced apart from the base 100 by a water tank support 233 that will be described later.

The water tank 51 may be horizontally spaced apart from the fermentation module 1, which will be described later.

The water tank 51 may have an opened top surface. The water tank 51 may have front and rear curved surfaces that are rounded in the horizontal direction and both planar side surfaces. Here, each of the front and rear surfaces of the water tank 51 may have substantially the same curvature as that of an outer circumferential surface of the fermentation module 1.

However, this embodiment is not limited thereto. For example, the water tank 51 may vary in shape as desired. For example, the water tank 51 may have a hollow shape having an opened top surface.

A water tank handle 59 may be disposed on the water tank 51. The water tank handle 59 may be rotatably coupled to the water tank 51. In more detail, the water tank handle 59 may have both ends that are hinge-coupled to both side surfaces of the water tank 51.

A user may hold the water tank 59 to lift the water tank 51 in the state in which the water tank handle 59 is rotated in an upward direction.

A stepped portion 51a may be disposed on an upper end of the water tank 51. A portion of an upper end of the water tank 51 may be stepped to form the stepped portion 51a. Thus, the stepped portion of the water tank 51 may have a height less than that of the remaining upper end of the water tank 51. A portion of a front portion of the upper end of the water tank 51 may be stepped to form the stepped portion 51a.

The water tank handle 59 may contact the stepped portion 51a. Here, the width of the water tank handle 59 may be the same as the stepped height of the stepped portion. Also, the water tank handle 59 may have a bent portion. The bent portion may have substantially the same curvature as that of the front surface of the water tank 51.

The beverage maker may further include a water tank lid 110 covering the opened top surface of the water tank 51. The water tank lid 110 may open and close an inner space of the water tank 51 so that it may be accessed.

The water tank lid 110 may be rotatably coupled to the water tank 51.

The water tank lid 110 may include a second hinge connecting portion 110A protruding backward. The second hinge connecting portion 110A may be hinge-coupled to the water tank 51.

The water tank lid 110 may have a shape that is the same as or similar to that of the fermentation lid 107. Thus, the beverage maker may have unity in design, and the same component may be used for each of the water tank lid 110 and the fermentation lid 107.

A height from the base 100 to the fermentation lid 107 may be equal or substantially the same as a height from the base 100 to the water tank lid 110. In more detail, a top surface from the base 100 to the fermentation lid 107 may have the same height as a top surface from the base 100 to the water tank lid 110.

The beverage maker may further include an outer case 200. The outer case 200 may be disposed on the base 100.

The outer case 200 may define an outer appearance of the beverage maker. The outer case 200 may include a fermentation module cover 201 covering the fermentation module 1 and a water tank cover 202 covering the water tank 51. Each of the fermentation module cover 201 and the water tank cover 202 may have a hollow shape. A portion of a circumferential surface of each of the fermentation module cover 201 and the water tank cover 202 may be opened.

The fermentation module cover 201 and the water tank cover 202 surround at least portions of outer circumferences of the fermentation module 1 and the water tank 51, respectively. The fermentation module cover 201 and the water tank cover 51 are attached to the fermentation module 1 and the water tank 51 and protect the fermentation module 1 and the water tank 51 against an external impact.

The fermentation module cover 201 and the water tank cover 202 may be horizontally disposed to be spaced apart from each other.

The fermentation module cover 201 and the water tank cover 202 may have the same or substantially the same height and/or diameter. Thus, the overall look and design of the beverage maker may be improved due to symmetric structure and unity of the outer appearance thereof.

The outer case 200 may be provided as an assembly of a plurality of members. The outer case 200 may include a front cover 210 and a rear cover 220.

The front cover 210 may be disposed at the front side of the fermentation module 1 (side whether the beverage is dispensed), the water tank 51, and the main frame 230, and the rear cover may be disposed at the rear side of the fermentation module 1, the water tank, and the main frame 230.

The front cover 210 may define an outer appearance of the front side of the beverage maker.

The dispenser 62 may be disposed closer to an upper end (top) of the front cover 210 than a lower end (bottom) of the front cover 210. The dispenser 62 may be disposed above the beverage container 101. The user may manipulate the dispenser 62 to dispense the beverage.

The front cover 210 may be provided as an assembly of a plurality of members.

The front cover 210 may include a front fermentation module cover 211, a front water tank cover 212, and a center cover 213 (where the dispenser 62 is located).

The front fermentation module cover 211 may cover a portion of the front portion of the outer circumference of the fermentation module 1. The front fermentation module cover 211 may be a portion of the front portion of the fermentation module cover 210.

The front fermentation module cover 211 may constitute the fermentation module cover 201 together with the rear fermentation module cover 262 of the rear cover 220. That is, the fermentation module cover 201 may include a front fermentation module cover 211 and a rear fermentation module cover 262. The front fermentation module cover 211 and the rear fermentation module cover 262 may be coupled to each other.

The rear fermentation module cover 262 may cover a portion of the rear portion of the fermentation module 1. The rear fermentation module cover 262 may form a portion of the rear portion of the fermentation module cover 201. The rear fermentation module cover 262 may be disposed at the rear side of the front fermentation module cover 211.

The front water tank cover 212 may cover the front surface of the water tank 51. The front water tank cover 212 may form a portion of the front portion of the water tank cover 202.

The front water tank cover 212 may constitute the water tank cover 202 together with the rear water tank cover 263 of the rear cover 220. That is, the water tank cover 202 may include the front water tank cover 212 and the rear water tank cover 263. The front water tank cover 212 and the rear water tank cover 263 may be coupled to each other.

The rear water tank cover 263 may cover a portion of the rear portion of the outer circumference of the water tank 51. The rear water tank cover 263 may be disposed at the rear side of the front water tank cover 212.

The center cover 213 may be disposed between the front fermentation module cover 211 and the front water tank cover 212. The center cover 213 may have both ends respectively contacting the front fermentation module cover 211 and the front water tank cover 212.

The center cover 213 may have a flat plate-like shape that is vertically disposed, e.g., rectangular shaped.

The center cover 213 may have the same or substantially the same height as each of the front fermentation module cover 211 and the front water tank cover 212.

A dispensing valve mounting part 214 on which the dispenser 62 is mounted may be disposed on the center cover 213. A dispenser body 600 of the dispenser 62 may be mounted on the dispensing valve mounting part 214. The dispensing valve mounting part 214 may be disposed closer to an upper end of the center cover 213 than a lower end of the center cover 210.

A through-hole 214A that is opened forward and backward may be defined in the dispensing valve mounting part 214. The beverage dispensing channel 61 or the dispensing channel (see reference numeral 611 of FIG. 5) may pass through the through-hole 214A and then be coupled to each other.

The beverage maker may include a display 282 for displaying various pieces of information of the beverage maker. The display 282 may be disposed on the center cover 213.

The display 282 may be disposed at a portion of the center cover 213, which is not covered by the dispenser 62. That is, the display 282 may not overlap the dispenser 62 in the horizontal direction. For example, the display 282 may be disposed below the dispenser 62.

The display 282 may include a display element such as an LCD, an LED, an OLED, and the like. The display 282 may include a display PCB on which the display element is installed. The display PCB may be mounted on a rear surface of the center cover 213 and electrically connected to a controller 281A that will be described later.

The beverage maker may include an input unit receiving a command related to the making of the beverage maker.

The input unit may include at least one of a touch screen receiving a user's command in a touch member, a rotary knob held by the user to rotate, and a button pushed by the user.

For example, the input unit may include the rotary knob 282. The rotary knob 283 may be disposed on the center cover 213. The rotary knob 283 may be disposed below the display 282.

The rotary knob 283 may function as a button that is pushed by the user. That is, the user may hold the rotary knob 283 so that the rotary knob 283 rotates, or the user may input a control command by pushing a front surface of the rotary knob 283.

Also, the input unit may include the touch screen receiving the user's command in the touch manner. The touch screen may be provided on the display 282, or the display 282 may function as the touch screen.

The input unit may be electrically connected to the controller 281A that will be described later.

Also, the beverage maker may further include a wireless communication module (not shown). This embodiment is not limited to kinds of wireless communication modules. For example, the wireless communication module may include a Bluetooth module and/or Wi-Fi module.

The wireless communication module may be disposed on a rear surface of the center cover 213.

The wireless communication module may be electrically connected to the controller 281A that will be described later. The beverage maker may wirelessly communicate with a separate mobile terminal and the like. The user may input a command, inquire making information, or monitor a making process in real time by using the mobile terminal.

The rear cover 220 may be coupled to the front cover 210, and an inner space of the outer case 200 may be defined between the rear cover 220 and the front cover 210.

The rear cover 220 may include a first rear cover 260 and a second rear cover 270. The first rear cover 260 may be placed on the base 100, and the second rear cover 270 may be mounted at a rear side of the first rear cover 260.

The first rear cover 260 may have an opening 264 that is opened forward and backward. In more detail, the cover body 261 may have an opening 264 that is opened forward and backward. The opening 264 may be disposed to face the main frame 230 in the front and rear direction. Thus, the user may access the inside of the beverage maker without separating the first rear cover 260.

The first rear cover 260 may include a cover body 261, a rear fermentation module cover 262, and a rear water tank cover 263. As described above, the rear fermentation module cover 262 may constitute the fermentation module cover 201 together with the front fermentation module cover 211, and the rear water tank cover 263 may constitute the water cover 202 together with the front water tank cover 212.

The rear fermentation module cover 262 and the rear water tank cover 263 may be mounted on the cover body 261. The rear fermentation module cover 262 and the rear water tank cover 263 may be mounted at a front side with respect to the cover body 261.

A portion of a top surface of the cover body 261 may be disposed between the rear fermentation module cover 262 and the rear water tank cover 263.

Avoiding grooves 262C and 263C may be formed at upper ends of the rear fermentation module cover 262 and the rear water tank cover 263, respectively. The first avoiding groove 262C defined in the rear fermentation module cover 262 may correspond to a first hinge connecting portion 107A disposed on the lid body 109 of the fermentation lid 107. The second avoiding groove 263C defined in the rear water tank cover 263 may correspond to a second hinge connecting portion 110A disposed on the water tank lid 110.

Each of the avoiding grooves 262C and 263C may be a constituent for avoiding interference with each of the hinge connecting portions 107A and 110A.

A through-hole 265 may be defined in the rear fermentation module cover 262. The through-hole 265 may be lengthily defined in the vertical direction and be opened in the front and rear direction, such as shown in FIG. 4. The channels connected to the fermentation module 1 may not interfere with the rear fermentation module cover 262 by the through-hole 265.

The cover body 261 may support the ingredient supply module 3. At least a portion of the ingredient supply module 3 may be disposed on a top surface of the cover body 261, and the cover body 261 may support the ingredient supply module 3 at a lower side.

A connecting channel avoiding groove 261A for avoiding interference with the connecting channels (see reference numerals 311 and 312 of FIG. 2) of the ingredient supply module 3 may be defined in the cover body 261.

The second rear cover 270 may be mounted at a rear side of the first rear cover 260. The second rear cover 270 may cover an opening 264 defined in the first rear cover 260.

The second rear cover 270 may be mounted on the cover body 261 of the first rear cover 260. The second rear cover 270 may be mounted to surround both side surfaces of the first rear cover 260.

An upper end of the second rear cover 270 may be mounted at the same height as the upper end of each of the rear fermentation module cover 262 and the rear water tank cover 263.

At least one through-hole 271 may be formed in the rear cover 220, more particularly, the second rear cover 270. The through-hole 271 may be formed to face the opening 264 and/or the through-hole 265 formed in the first rear cover 260.

A gas discharged from the gas discharge valve (see reference numeral 73 of FIG. 2) or the pressure release valve (see reference numeral 76 of FIG. 2) may be discharged to the outside of the beverage maker through the through-hole 271. Also, air exhausted from the exhaust valve (see reference numeral 156 of FIG. 2) may be exhausted to the outside of the beverage maker through the through-hole 271.

The blower fan 135 may be disposed at a front side of the condenser 132. In more detail, the blower fan 135 may be disposed at a position that overlaps the opening 264 and the through-hole 271 in the front and rear direction, and the condenser may be disposed between the blower fan 135 and the through-hole 271. The air heat-exchanged in the condenser 132 may sequentially pass through the opening 264 and the through-hole 271 by the blower fan 135 and be discharged to the outside of the outer case 200.

An ingredient supplier accommodating part 272 may be disposed in the second rear cover 270. The ingredient supplier accommodating part 272 may be disposed on an upper end of the second rear cover. A portion of a rear portion of the ingredient supply module 3 may be accommodated in the ingredient supplier accommodating part 272.

Also, a third avoiding groove 275 and a fourth avoiding groove 276 may be defined in the second rear cover 270. The third avoiding groove 275 may correspond to the first avoid groove 262C formed in the rear fermentation module cover 262, and the fourth avoiding grove 276 may correspond to the second avoiding groove 263C formed in the rear water tank cover 263.

The ingredient supply module 3 may be disposed between the fermentation module 1 and the water tank 51. Thus, when compared with a case in which the ingredient supplier 3 is disposed at a position except between the fermentation module 1 and the water tank 51, the ingredient supply module 3 may be more compact, and the ingredient supply module 3 may be protected by the fermentation cover 1 and the water tank 51.

At least a portion of each of both side surfaces of the ingredient supply module 3 may be curved, and the curved surface may contact each of an outer circumference of the fermentation module cover 201 and an outer circumference of the water tank cover 202.

The ingredient supply module 3 may be disposed above the base 100 so as to be vertically spaced apart from the base 100. The ingredient supply module 3 may be disposed above the main frame 230.

The ingredient supply module 3 may be disposed between the front cover 210 and the rear cover 220 in the front and rear direction. A front surface of the ingredient supply module 3 may be covered by the front cover 210 and the center cover 213, and a rear surface of the ingredient supply module 3 may be covered by the ingredient supplier accommodating part 272 of the second rear cover 270.

The ingredient supply module 3 may be supported by the cover body 261 of the first rear cover 260 and the ingredient supplier accommodating part 272 of the second rear cover 270.

The ingredient supply module 3 may include a capsule mounting body 36 on which capsule mounting parts 31, 32, and 33 (on which capsules C1, C2, and C3 are detachably mounted) are disposed and a lid module 37 covering the capsule mounting parts 31, 32, and 33.

The capsule mounting body 36 may be supported by the cover body 261 of the first rear cover 260 and the ingredient supplier support part 273 of the second rear cover 270.

The lid module 37 may be slidably disposed or rotatably disposed on the capsule mounting body 36. The lid module 37 may also be hinge-coupled to the capsule mounting body 36.

The ingredient supply module 3 may be installed at an approximately central upper portion of the beverage maker. The lid module 37 of the ingredient supply module 3 may be configured so that a user can easily mount or separate capsules C1, C2, and C3.

The beverage maker may include a main frame 230. The main frame may be a constituent to which at least portions of the valves and the channels, which are described above, are fixed.

The main frame 230 may be disposed between the front cover 210 and the rear cover 220 in the front and rear direction. The main frame 230 may be disposed to contact the outer circumference of the fermentation module 1.

The main frame 230 may be placed on the base 100. The main frame 230 may include a water tank support 233. The water tank support 233 may vertically space the water tank 51 from the base 100.

At least a portion of the main frame 230 may be disposed below the ingredient supply module 3.

At least one of the water supply pump 52, the water supply heater 53, the blower fan 135, the air pump 82 may be mounted on the main frame 230. For example, the blower fan 135 and the air pump 82 may be mounted on the main frame 230, and the water supply pump 52 and the water supply heater 53 may be mounted on the base 100.

The main frame 230 may partition the condenser 132 from the fermentation module 1 so as to prevent a temperature of the fermentation module 1 from increasing by heat of the condenser 132.

The compressor 131 may be disposed between the base 100 and the water tank 51 in the vertical direction.

The water supply heater 53 and the water supply pump 52 may be disposed at a front side of the main frame 230. The condenser 132 may be disposed at the rear side of the blower fan 135 mounted on the main frame 230.

The condenser 132 may be disposed to face the blower fan 135 mounted on the main frame 230. The condenser 132 may be disposed at the rear side of the blower fan 135.

The beverage maker may include a control module 280 controlling the beverage maker.

The control module 280 may be an electric component of the beverage maker. The control module 280 may be separably mounted on the main frame 230.

The control module 280 may be disposed on the main frame 230. The control module 280 may be coupled to the rear surface of the main frame 230.

The PCB case 281 may be coupled to the main frame 230 to protect the main PCB therein.

At least a portion of the control module 280 may be disposed to face the opening 264 defined in the first rear cover 260.

The control module 280 may include a main PCB and a PCB case 281 in which the main PCB is built. The main PCB may include a controller 281A for controlling an operation the constituents of the beverage maker.

The controller 281A provided in the control module 280 may be electrically connected to the wireless communication module. For example, the controller 281A may receive a command received through the wireless communication module, and thus, the beverage may be made. Also, the controller 281A may communicate information related to the beverage maker or the beverage to be made from the wireless communication module to a separate mobile terminal.

Also, the controller 281A may receive the command inputted into the input unit. For example, the controller 281A may make a beverage according to the command inputted by the rotary knob 283. Also, the controller 281A may control the display 282 to output various pieces of information of the beverage maker. For example, the controller 281A may display an amount of dispensed beverage, an amount of residual beverage, information related to completion of dispensing of the beverage, and the like through the display 282.

The controller 281A may control at least one of the water supply pump 52, the water supply heater 53, the air pump 82, and the temperature controller 11. Also, controller 281A may control at least one of the flow rate control valve 54, the ingredient supply valve 310, the main valve 40, the bypass valve 35, the air supply valve 159, the exhaust valve 156, the beverage dispensing valve 64, the sub valve 92, the gas discharge valve 73, and the pressure release valve 76.

The controller 281A may receive a measurement value of at least one of the flow meter 56, the thermistor 54A, the water supply temperature sensor 57, the temperature sensor 16, and the gas pressure sensor 72.

In more detail, the controller 281A may detect an inner pressure of the fermentation container 12 by the gas pressure sensor 72 and detect a temperature of the fermentation tank 112 by the temperature sensor 16. The control module 280 may determine a degree of fermentation of the beverage by using the detected pressure or temperature.

Also, the controller 281A may detect a temperature of water supplied from the water supply module 5 to the first main channel 41 by using the water supply temperature sensor 57. The controller 281A may control the water supply heater 53 according to the detected temperature of the water.

Also, the controller 281A may control the temperature controller 11 to maintain the temperature of the fermentation tank 112 to a sufficient temperature.

Also, the controller 281A may accumulate at least one of a time taken to open the dispenser 62, a time taken to drive the air pump 82, a time taken to turn on the main valve 40 after the beverage is completely made. The controller 281A may calculate or determine the amount of dispensed beverage that is dispensed from the fermentation container 12 according to the accumulated time. The controller 281A may calculate the amount of residual beverage from the calculated amount of dispensed beverage. The controller 281A may then determine whether the beverage within the fermentation container 12 is completely dispensed from the information of the calculated amount of residual beverage. The controller 281A may determine that the beverage is completely dispensed when it is determined that the beverage within the fermentation container 12 is completely dispensed.

In addition, the controller 281A may control an overall operation of the beverage maker. This will be described below in detail.

Figure 5:
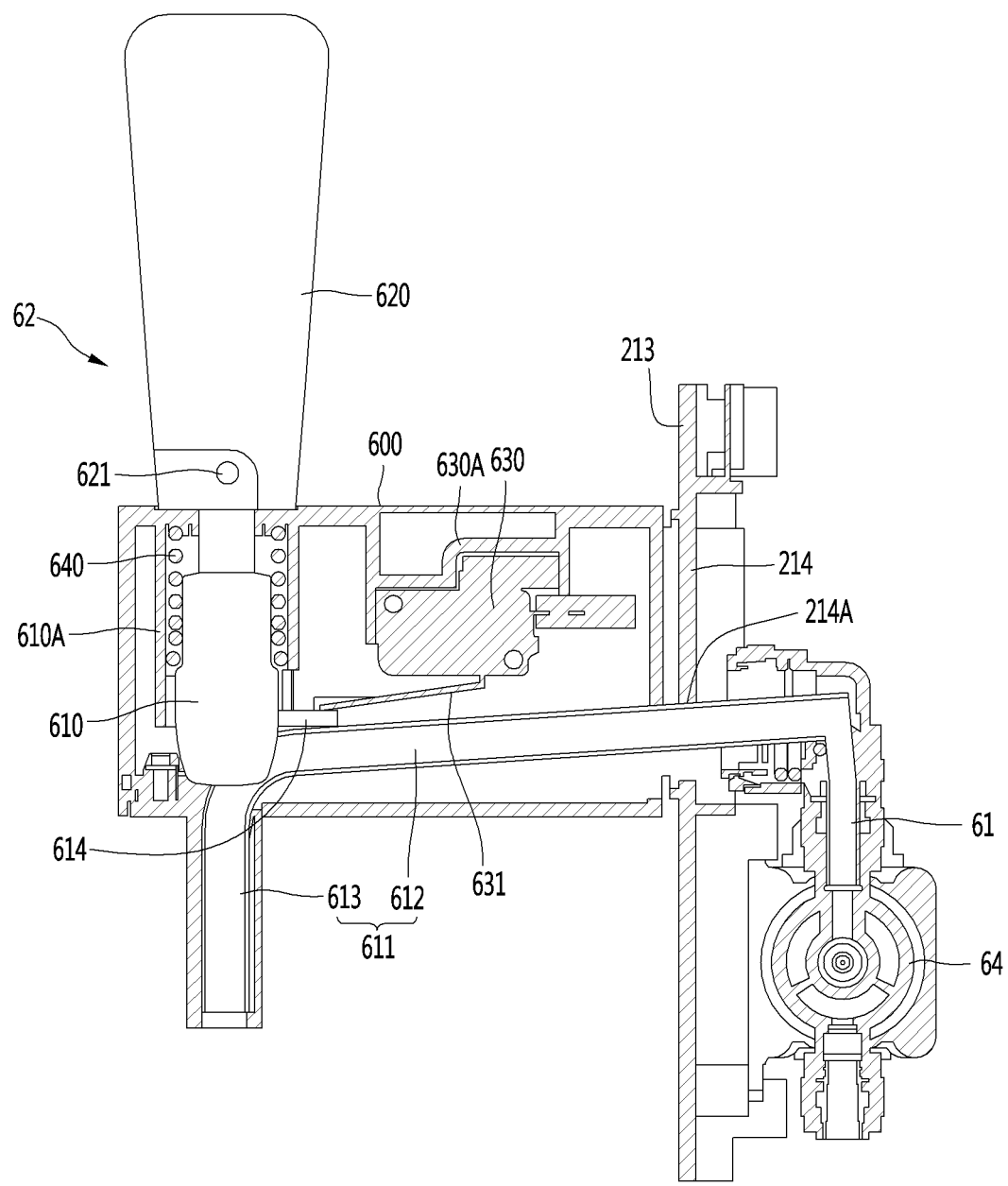
FIG. 5 is a cross-sectional view illustrating a dispenser of the beverage maker of FIG. 2 according to an embodiment of the present invention.

FIG. 5 is a cross-sectional view illustrating the dispenser of the beverage maker of FIG. 2 according to an exemplary embodiment.

The dispenser 62 may include a dispenser body 600, an elevation body 610, a lever 620, and a limit switch 630.

A dispenser channel 611 connected to the beverage dispensing channel 61 may be provided in the dispenser body 600.

The elevation body 610 may be disposed to be elevatable within the dispenser body 600.

The lever 620 may be rotatably connected to an upper portion of the elevation body 610 to elevate the elevation body 610 when rotating.

The limit switch 630 may be switched by the elevation body 610.

The dispenser 62 may further include a valve spring 640 disposed in the dispenser body 600 to elastically press the elevation body 610 downward.

The dispenser body 600 may be coupled with the dispensing valve mounting part 214 disposed on the center cover 213.

The dispenser channel 611 may include a first dispenser channel 612 disposed to be inclined along the dispenser body 600 and a second dispenser channel 613 that is bent from a front end of the first dispenser channel 612 in a downward direction.

The beverage guided to the beverage dispensing channel 61 may sequentially pass through the first dispenser channel 612 and the second dispenser channel 613 when the elevation body 610 is opened and then drop down to the lower side (bottom) of the second dispenser channel 613.

A channel accommodating space in which the dispenser channel 611 is accommodated may be formed in the dispenser body 600.

A manipulation protrusion 614 allowing a terminal 631 of the limit switch 630 to come into point contact with the elevation body 610 when ascending may protrude from the elevation body 610. When the elevation body 610 ascends, the terminal of the limit switch 630 may come into point contact with the elevation body 610. When the elevation body 610 descends, the point contact of the terminal of the limit switch 630 may be released.

A guide part 610A guiding the elevation body 610 in the vertical direction may be disposed on the dispenser body 600.

The lever 620 may be connected to a hinge 621 disposed on an upper portion of the elevation body 610. In the state in which the lever 620 is connected to the elevation body 610, the lever may stand up in the vertical direction or laid in the horizontal direction.

When the lever 620 is laid in the horizontal direction, the elevation body 610 may ascend to turn on the limit switch 630. When the lever 620 stands up in the vertical direction, the elevation body 610 may descend to turn off the limit switch 630.

The limit switch 630 may be electrically connected to the controller 281A, and the controller 281A may control the beverage maker according to the turn on/off of the limit switch 630.

When the user manipulates the lever 620 in a direction in which the dispenser 62 is opened, the elevation body 610 may ascend to point-contact the limit switch, and the controller 281A may detect the opening of the dispenser 62. On the other hand, when the user manipulates the lever 620 in a direction in which the dispenser 62 is closed, the elevation body 610 may descend to release the point-contact of the limit switch, and the controller 281A may detect the closing of the dispenser 62.

A switch mounting part 630A on which the limit switch 630 is mounted may be disposed on the dispenser body 600.

The valve spring 640 may be disposed inside the guide part 610A of the dispenser body 600 to elastically press the elevation body 610 downward.

The beverage dispensing valve 64 of the beverage dispenser 6 may be coupled to the rear surface of the center cover 213.

Figure 6:
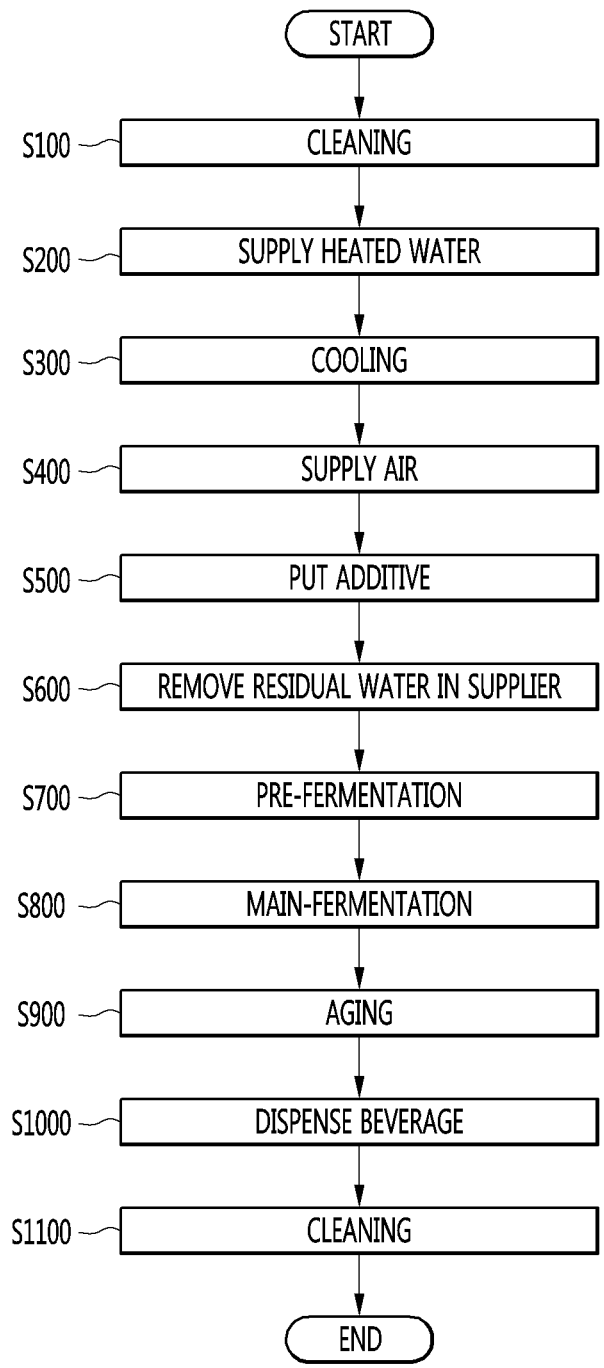
FIG. 6 is a flowchart illustrating a process of controlling the beverage maker according to an embodiment of the present invention.

FIG. 6 is a flowchart illustrating a process of controlling the beverage maker according to an exemplary embodiment.

Hereinafter, an operation of the beverage maker according to this embodiment will be described with reference to FIGS. 2 and 6.

The beverage maker according to this embodiment may include cleaning processes (S100 and S1100) for cleaning the channels. The cleaning processes (S100 and S1100) may be separately performed with respect to a beverage making process.

The cleaning processes (S100 and S1100) may be performed before and after the beverage making process.

Also, the cleaning processes (S100 and S1100) may be performed by a user input during the beverage making process. In this case, like a primary fermentation process (S700) or a secondary fermentation process (S800), which will be described later, the cleaning processes (S100 and S1100) may be performed while the main valve 40 is closed, and the additives are not contained in the ingredient suppler 3.

The cleaning processes (S100 and S1100) may be performed in a state in which the capsules C1, C2, and C3 are not accommodated in the ingredient supply module 3.

On the other hand, the cleaning processes (S100 and S1100) may be performed in a state in which the capsules C1, C2, and C3 are accommodated in the ingredient supply module 3, and the fermentation container 12 is accommodated in the fermentation tank 112.

The user may input a cleaning command through the input unit provided in the control module 280, a remote controller, or a portable terminal. The controller 281A may control the beverage maker to perform the cleaning processes (S100 and S1100) according to the input of the cleaning command.

Also, the user may input a beverage making command through the input unit provided in the control module 280, a remote controller, or a portable terminal. The controller 281A may control the beverage maker to perform the cleaning processes (S100 and S1100) before and after the beverage making process according to the input of the beverage making process.

Hereinafter, the cleaning process (S100) performed before the beverage making process will now be described.

When the dispenser 62 is in a closed state, the controller 281A may display a message for opening the dispenser 62 on the display 282, and thus, the user may open the dispenser 62.

When the dispenser 62 is opened, and the cleaning command is input, the controller 281A may open the beverage dispensing valve 64 to turn on the water supply pump 52 and the water supply heater 53. Also, the controller 281A may control the main valve 40 to be maintained in the closed state.

The controller 281A may perform cleaning of the ingredient supply module 3 and the bypass channel 4C. The controller 281A may open the ingredient supply valve 310 and the bypass valve 35. Also, the controller 281A may perform cleaning of the sub channel 91. The controller 281A may open the sub valve 92.

When the water supply pump 52 is turned on, water of the water tank 51 may flow to the water supply heater 53 and then be heated in the water supply heater 53.

The water heated by the water supply heater 53 may flow to be divided into the sub channel 91 and the first main channel 41.

The water flowing to the sub channel 91 may pass through the sub valve 92 to flow to the beverage dispensing channel 61 and then pass through the beverage dispensing valve 64 and be dispensed to the dispenser 62.

Also, the water flowing to the first main channel 41 may flow to be divided into the ingredient supply module 3 and the bypass channel 43.

The water flowing to the ingredient supply module 3 may sequentially pass through the ingredient supply valve 310, the initial capsule mounting part 31, the intermediate capsule mounting part 32, and the final capsule mounting part 33 to flow to the second main channel 42 and then flow to the beverage dispensing valve 64 to pass through the beverage dispensing valve 64 so as to be dispensed to the dispenser 62.

The water flowing to the bypass channel 54 may pass through the bypass valve 35 to flow to the second main channel 42 and then flow to the beverage dispensing channel 62 to pass through the beverage dispensing valve 64 so as be dispensed to the dispenser 62.

When controlled as described above, the main channels 41 and 42, the bypass channel 43, the sub channel 91, the beverage dispensing channel 64, and the valves installed in the channels, and the dispenser 62 may be sterilized and washed. Also, the capsule mounting parts 31, 32, and 33, and the connecting channels 311 and 312 may be sterilized and washed.

The cleaning may also be performed during a cleaning set time. After the cleaning set time, the cleaning process may be completed.

When the cleaning set time elapses, the controller 281A may turn off the water supply pump 52 and the water supply heater 53 to close all of the beverage dispensing valve 64, the bypass valve 35, the ingredient supply valve 310, and the sub valve 92.

Also, the beverage making process of making a beverage may be performed on the beverage maker according to this embodiment.

For the beverage making process, the user may open the fermentation lid 107 and insert the fermentation container 12 into the opening 170 to seat the fermentation container 12 on the fermentation tank module 111. Here, malt may be in a state of being contained in the fermentation container 12. The malt may be accommodated in the form of malt oil.

Thereafter, the user may close the fermentation lid 107, and the fermentation container 12 may be accommodated in the fermentation tank module 111 and the fermentation lid 107. Here, the inside of the fermentation tank 112 may be closed by the fermentation lid 107.

Also, the user may insert the plurality of capsules C1, C2, and C3 into the ingredient supply module 3 before the fermentation container 12 is seated to cover the plurality of capsule mounting parts 31, 32, and 33 by using the lid module 37.

The user may input the beverage making command through the input unit, the remote controller, or the mobile terminal connected to the controller 281A. The controller 281A may control the beverage maker to perform the beverage making process according to the input of the beverage making command.

Next, the beverage making process may include a water supply process (S200) in accordance with an embodiment of the invention.

The water supply process (S200) may be a liquid malt formation process of mixing the malt in the fermentation container 12 with the heated water to form liquid malt.

In the water supply process (S200), the controller 281A may turn on the water supply pump 52 and the water supply heater 53 and close the ingredient supply valve 310. In the water supply process (S200), the controller 281A may turn off the bypass valve 35 and the main valve 40.

When the water is supplied to the fermentation container 12, the controller 281A may turn off the exhaust valve 156.

In the above-described control, the water discharged from the water tank 51 may pass through the water supply pump 52 to flow to the water supply heater 53 and then be heated in the water supply heater 53. The water heated by the water supply heater 53 may flow from the first main channel 41 to the bypass valve 43 to pass through the bypass valve 53 and then flow to the second main channel 42. The water flowing to the second main channel 42 may pass through the main valve 40 and be introduced into the fermentation container 12. The heated water introduced into the fermentation container 12 may be accommodated in the fermentation container 12 and then be mixed with the malt. The malt within the fermentation container 12 may be mixed with the water and gradually diluted. Since the heated water is supplied to the fermentation container 12, the malt accommodated in the fermentation container 12 may be more quickly uniformly mixed with the heated water.

When the water is introduced as described above, the fermentation container 12 may be gradually expanded. Thus, a portion of air between the outer surface of the fermentation container 12 and the inner wall of the fermentation tank 112 may flow to the air supply channel 154 and then be discharged to the exhaust valve 156 due to the expansion of the fermentation container 12.

Thus, while the water is introduced into the fermentation container 12, the fermentation container 12 may receive the water without being blown or torn in the fermentation tank 112.

In the water supply process (S200), the water supply heater 53 may heat the water to a temperature of about 50° C. to about 70° C. (not limited thereto). The controller 281A may control the water supply heater 53 according to the temperature by the water supply temperature sensor 57.

The controller 281A may perform the water supply process (S200) until an amount of accumulated water detected by the flow meter 56 reaches a set flow rate, and when the amount of accumulated water detected by the flow meter 56 reaches the set flow rate, the water supply process (S200) may be completed.

When the water supply process (S200) is completed, the controller 281A may turn off the water supply pump 52 and the water supply heater 53 and close the bypass valve 35. When the water supply process (S200) is completed, the controller 281A may close the gas discharge valve 73 and the exhaust valve 156.

While the water supply process (S200) is performed, the controller 281A may control the fermentation container 12 so that the air is introduced into the fermentation container 12.

The controller 281A may control the fermentation container 12 to stop the operation of the fermentation container 12 after the water is primarily introduced into the fermentation container 12 and then to stop the operation of the fermentation container 12 after the air is injected into the fermentation container 12, and finally, to stop the operation of the fermentation container 12 after the heated water is secondarily introduced into the fermentation container 12. After the primary water introduction, the air injection, and the secondary water introduction are successively completed, the water supply process (S200) may be completed.

For example, in the water supply process (S200), only a heated water supply process of supplying the heated water may be performed.

For another example, in the water supply process (S200), a primary heated water supply process of primarily supplying the heated water, an air injection process of injecting the air, and a secondary heated water supply process of secondarily supplying the heated water may be successively performed.

For example, when only the heated water supply process is performed, the water supply process (S200) may be the same as described above, so its detailed description will be omitted.

Hereinafter, the water supply process (S200) including the primary heated water supply process, the air injection process, the secondary heated water supply process, which are successively performed, will be described as another example of the water supply process (S200).

When the primary heated water supply process starts, the controller 281A may turn on the water supply pump 52 and the water supply heater 53, turn off the bypass valve 35 and the main valve 40, and maintain the closing of the ingredient supply valve 310. Also, when the primary heated water supply process starts, the controller 281A may open the gas discharge valve 73 and the exhaust valve 156.

When the primary heated water supply process is performed, water may be introduced into the fermentation container 12, the fermentation container 12 may be expanded by the introduced water, a portion of air between the fermentation container 12 and the fermentation tank 112 may be pushed by the expanded fermentation container 12 to flow to the air supply channel 154 and then be exhausted to the outside through the exhaust valve 156.

The controller 281A may determine completion of the primary heated water supply process according to a flow rate detected by the flow meter during the primary heated water supply process. When the detected flow rate detected by the flow meter 56 reaches a first set flow rate during the primary heated water supply process, the controller 281A may determine that the primary heated water supply process is completed, turn off the water supply pump 52 and the water supply heater 53, and maintain the opened state of the bypass valve 35 and the main valve 40. Also, when the primary heated water supply process is completed, the controller 281A may maintain the opened state of the gas discharge valve 73 and the exhaust valve 156.

When the primary heated water supply process is completed, the air injection process may be performed.

When the air injection process starts, the controller 281A may turn on the air pump 82. Also, the controller 281A may maintain the closing of the air supply valve 159.

While the air pump 82 is turned on, air injected into the air injection channel 81 may flow from the first main channel 1 to the second main channel through the bypass channel 43 and then be introduced into the fermentation container 12 by passing through the main valve 40. As described above, the air introduced into the fermentation container 12 may collide with liquid malt to assist the uniform mixing of the heated water and the liquid malt.

Since the air is introduced into the fermentation container 12, the fermentation container 12 may be expanded, a portion of the air between the outer surface of the fermentation container 12 and the inner wall of the fermentation tank 112 may be pushed by the expanded fermentation container 12 to flow to the air supply channel 154 and then be exhausted to the outside through the exhaust valve 156.

When a pressure detected by the gas pressure sensor 72 is equal to or greater than a set pressure, the controller 281A may complete the air injection process. For the completion of the air injection process, the controller 281A may turn off the air pump 82. When the air injection process is completed, the control module 280 may maintain the opening of the main valve 40, the bypass valve 35, the gas discharge valve 73, and the exhaust valve 156.

When the air injection process is completed, the secondary heated water supply process may be performed.

When the secondary heated water supply process starts, the controller 281A may turn on the water supply pump 52 and the water supply heater 53.

Like the primary heated water supply process, the water of the water tank 51 may be supplied to the fermentation container 12, and new heated water may be additionally supplied to the fermentation container 12.

As described above, in the secondary heated water supply process, the fermentation container 12 may be further expanded by the additionally supplied water, and a portion of the air between the outer surface of the fermentation container 12 and the inner wall of the fermentation tank 112 may be pushed by the expanded fermentation container 12 to flow to the air supply channel 154 and then be exhausted to the outside through the exhaust valve 156.

The controller 281A may determine completion of the secondary heated water supply process according to a flow rate detected by the flow meter during the secondary heated water supply process. When the detected flow rate detected by the flow meter 56 reaches a first set flow rate during the secondary heated water supply process, the controller 281A may determine that the secondary heated water supply process is completed, turn off the water supply pump 52 and the water supply heater 53, and close the main valve 40 and the bypass valve 35. Also, when the secondary heated water supply process is completed, the controller 281A may close the gas discharge valve 73 and the exhaust valve 156.

Next, the beverage making process may include a fermentation tank cooling process (S300) in accordance with an embodiment of the invention.

In more detail, when the water supply process (S200) is completed, the fermentation tank cooling process (S300) for cooling the fermentation tank 112 may be performed.

The controller 281A may control the temperature controller 11 to cool the fermentation tank 112. In more detail, the controller 281A may control the refrigerant cycle device to cool the fermentation tank 112.

A refrigerant may pass through the evaporator 134 to absorb heat of the fermentation tank 112 and then be evaporated. When the refrigerant cycle device is driven, the fermentation tank 112 may be gradually cooled, and also, the fermentation container 12 accommodated in the fermentation tank 112 and the liquid malt accommodated in the fermentation container 12 may be cooled.

As described above, when the fermentation tank 112 is cooled, the evaporator 134 may cool the fermentation container 12, and the controller 281A may control the refrigerant cycle device according to the temperature detected by the temperature sensor 16 installed in the fermentation tank 112.

The controller 281A may control the compressor so that the temperature detected by the temperature sensor 16 is maintained at the set temperature (for example, about 35° C.). In more detail, when the temperature detected by the temperature sensor 16 exceeds a compressor turn-on temperature (for example, about 35.5° C.), the controller 281A may turn on the compressor of the refrigerant cycle device 13. When the temperature detected by the temperature sensor 16 is less than a compressor turn-off temperature (for example, about 34.5° C.), the control module 280 may turn off the compressor.

When an additive input process (S500) that will be described later is performed, since the water supply heater 53 is in the closed state, a temperature of the fermentation container 12 may decrease somewhat when compared to the set temperature that is set in the cooling process (S300) by the water introduced into the fermentation container 12 together with the additives. For example, the temperature of the fermentation container 12 may decrease to a temperature of about 30° C. when the temperature of the fermentation container 12 is maintained at a temperature of about 35° C. and the additive and water are put into the fermentation container 12 together. Thus, in the cooling process (S300), the set temperature may be determined in consideration of the lowered temperature.

While the fermentation cooling process (S300) is performed, the controller 281A may maintain the closing of the exhaust valve 156 to prevent the air between the outer surface of the fermentation container 12 and the inner wall of the fermentation tank 112 from leaking through the exhaust valve 156 to the outside, thereby quickly cooling the air within the fermentation tank 112.

When the temperature of the fermentation container 12 is lower than the set temperature even though the refrigerant cycle device 13 is turned off because an external temperature is extremely low, the controller 281A may turn on the heater 14 disposed in the lower portion of the fermentation tank 112. The controller 281A may turn off the heater 14 when the temperature detected by the temperature sensor 16 is less than a heat turn-on temperature. When the temperature detected by the temperature sensor 16 is less than a heater turn-off temperature, the control module 280 may turn off the heater.

The beverage making process may include an air supply process (S400) in accordance with an embodiment of the invention.

In more detail, after the fermentation tank cooling process (S300) starts, and the compressor of the refrigerant cycle device 13 is turned on, the beverage maker may perform the air supply process (S400) in which air is supplied into the fermentation container 12 to mix with the liquid malt when the temperature detected by the temperature sensor 16 is less than the compressor turn-off temperature.

Alternatively, when the fermentation tank cooling process (S300) starts, and the heater 14 is turned on, the beverage maker may perform the air supply process (S400) in which the air is supplied into the fermentation container 12 to mix with the liquid malt when the temperature detected by the temperature sensor 16 is less than the heater turn-off temperature.

While the air supply process (S400) is performed, the beverage maker may control the refrigerant cycle device 13 and the heater 14 to be turned on and off according to the temperature detected by the temperature sensor 16. The control of the turn-on/off of the refrigerant cycle device 13 and the heater 14 may continue (e.g., repeatedly turned on and off) until the additive input process (S500) is completed.

In the air supply process (S400), the controller 281A may turn on the air pump 82 and turn off the bypass valve 35 and the main valve 40. Also, the controller 281A may turn off the gas discharge valve 73 and the exhaust valve 156 and maintain the closed state of the air supply valve 159 and the ingredient supply valve 310.

While the air pump 82 is turned on, air injected into the air injection channel 81 may flow from the first main channel 41 to the second main channel 42 through the bypass channel 43 and then be introduced into the fermentation container 12 by passing through the main valve 40. As described above, the air introduced into the fermentation container 12 may interact with liquid malt to assist the uniform mixing of the heated water and the liquid malt, and the air interacting with the liquid malt may supply oxygen into the liquid malt. That is, the agitation and aeration may be performed.

While the air is injected into the fermentation container 12, the fermentation container 12 may be expanded by the air injected into the fermentation container 12. A portion of the air between the outer surface of the fermentation container 12 and the inner wall of the fermentation tank 112 may be pushed by the expanded fermentation container 12 to flow to the air supply channel 154 and then be exhausted to the outside through the exhaust valve 156. Thus, the fermentation container 12 may be easily expanded, and the air of the second main channel 42 may be quickly introduced into the fermentation container 12 and mixed with the liquid malt.

While the air pump 82 is turned on, the air is mixed with the liquid malt during a mixing set time, the air pump 82 is turned on, and the mixing set time elapses, the air supply process (S400) may be completed. When the air supply process (S400) is completed, the controller 281A may turn off the air pump 82 and close the bypass valve 35. Also, when the air supply process (S400) is completed, the controller 281A may close the gas discharge valve 73 and the exhaust valve 156.

The beverage making process may include the additive input process (S500) in accordance with an embodiment of the invention.

In more detail, the beverage maker may perform the additive input process (S500) after the air supply process (S400) is completed.

In the additive input process (S500), a first additive of the first capsule C1, a second additive of the second capsule C2, and a third additive of the third capsule C3 may be put into the fermentation container 12. Here, the first capsule C1 may be a capsule mounted on the initial capsule mounting part 31, the second capsule C2 may be a capsule mounted on the intermediate capsule mounting part 32, and the third capsule C3 may be a capsule mounted on the final capsule mounting part 33.

In the additive input process (S500), the controller 281A may turn on the water supply pump 52 and maintain the turn-off of the water supply heater 53. Also, the controller 281A may maintain the closing of the bypass valve 35 and open the ingredient supply valve 310 and the main valve 40. Also, the controller 281A may open the gas discharge valve 73 and the exhaust valve 156.

When the water supply pump 52 is turned on, the water of the water tank 51 may pass through the water supply pump 52 and the water supply heater 53 to flow to the first main channel 41 and then pass through the ingredient supply valve 310 and be introduced into the first capsule C1. The water introduced into the first capsule C1 may be mixed with the first additive accommodated in the first capsule C1 to flow to the first connecting channel 311 together with the first additive.

The fluid (the mixture of the water and the first additive) introduced into the second capsule C2 through the first connecting channel 311 may be combined with the second additive accommodated in the second capsule C2 to flow to the second connecting channel 312 together with the second additive.

The fluid (the mixture of the water and the first and second additives) introduced into the third capsule C3 through the second connecting channel 312 may be combined with the third additive to flow to the second main channel 42 together with the third additive.

The fluid (the mixture of the water and the first, second, and third additives) flowing to the second main channel may be introduced into the fermentation container 12 by passing through the main valve 40. In this way, all of the additives contained in the capsules C1, C2, and C3 may be put into the fermentation container 12.

When the additive input process (S500) starts, the accumulated flow rate detected by the flow meter 56 reaches an additive input set flow rate, the controller 281A may complete the additive input process (S500). When the additive input process (S500) is completed, the controller 281A may turn off the water supply pump 52.

The beverage making process may further include an ingredient supplier residual water removing process (S600) in accordance with an embodiment of the invention.

In more detail, when the additive input process (S500) is completed, the ingredient supplier residual water removing process (S600) for removing residual water within the ingredient supply module 3 may be performed.

In the ingredient supplier residual water removing process (S600), the controller may turn on the air pump 82 and maintain the closing of the air supply valve 159. Also, the controller 281A may open the ingredient supply valve 310 and the main valve 40. Also, the controller 281A may open the gas discharge valve 73 and the exhaust valve 156.

When the air pump 82 is turned on, the air injected into the air injection channel 81 may flow to the first main channel 41 to pass through the ingredient supply valve 310 and then be introduced into the first capsule C1. The air introduced into the first capsule C1 may successively pass through the first capsule C1, the second capsule C2, and the third capsule C3 to blow the residual water remaining in the capsules to the second main channel 42. The air flowing to the second main channel 42 may be introduced into the fermentation container 12 together with the residual water.

Thus, the additives and residual water that have not yet been extracted in each of the capsules C1, C2, and C3 may be put into the fermentation container 12 without leaving any residual water.

Since the residual water and the air are introduced from the second main channel 42 to the fermentation container 12, the fermentation container 12 may be further expanded, a portion of the air between the outer surface of the fermentation container 12 and the inner wall of the fermentation tank 112 may be pushed by the expanded fermentation container 12 to flow to the air supply channel 154 and then be exhausted to the outside through the exhaust valve 156. Thus, the fermentation container 12 may be easily expanded, and the air and the residual water of the second main channel 42 may be quickly introduced into the fermentation container 12.

The controller 281A may turn on the air pump 82 during the residual water removing set time, and when the residual water removing set time elapses, the ingredient supplier residual water removing process (S600) may be completed.

When the ingredient supplier residual water removing process (S600) is completed, the controller 281A may turn off the air pump 82 and close the ingredient supply valve 310 and the main valve 40. Also, the controller 281A may close the gas discharge valve 73 and the exhaust valve 156.

When the ingredient supplier residual water removing process (S600) is completed, the controller 281A may display a capsule separation message for informing separation of the capsules C1, C2, and C3 on the display 282, and the user may remove the empty capsule from the ingredient supply module 3.

The beverage making process may include fermentation processes (S700 and S800) in accordance with an embodiment of the invention. The fermentation process (S700 and S800) may be performed after the ingredient supplier residual water removing process (S600).

Particularly, the fermentation process (S700 and S800) according to an embodiment may include a pre-fermentation process (S700) and a main-fermentation (S800). The pre-fermentation process (S700) and the main-fermentation (S800) may be sequentially performed.

The pre-fermentation process (S700) may be a process for rapidly and actively activating yeast added to the fermentation container 12 during the additive input process (S500), and the main-fermentation process (S800) may be a process in which alcohol and carbonic acid are formed by the activated yeast.

In this connection, the beverage maker according to an embodiment may perform the fermentation process of the beverage being made by using powder yeast. The powder yeast may be inactivated when introduced into the fermentation tank 112 and may be activated after a predetermined time to perform fermentation.

However, if the environment (such as the fermentation tank temperature) in the fermentation tank 112 does not promote the activation of the yeast, a degree of activation of the yeast may be lowered. Generally, a temperature in the fermentation tank in the fermentation process may be set at about 21° C. or about 12° C. On the other hand, the yeast may maximize the degree of activation (propagation, growth) at about 28° C. to about 35° C. That is, when the yeast fermentation process is performed immediately after the input, a small amount of yeast may be activated. If the fermentation process is performed at a small amount of activated yeast, the beverage may not be fermented sufficiently, and stress of the yeast may increase, which may adversely affect the quality (taste or flavor) of the beverage. Thus, the beverage maker according to an embodiment may promote the activation of the yeast through the pre-fermentation process before the main-fermentation process.

In the pre-fermentation process (S700), the controller 281A may control the refrigerant cycle device 13 and the heater 14 so that the temperature measured by the temperature sensor 16 is maintained at a pre-fermentation set temperature (for example, about 30° C.). For example, the pre-fermentation set temperature may be set to be higher than the main-fermentation set temperature in the main fermentation process performed subsequently, thereby facilitating rapid activation of the yeast.

The controller 281A may control the refrigerant cycle device 13 and the heater 14 to maintain the temperature of the fermentation tank 112 at the pre-fermentation set temperature for a preset pre-fermentation set time. If the pre-fermentation progressing time reaches the pre-fermentation set time, the pre-fermentation process (S700) may be completed, and the main-fermentation process (S800) may be started. This will be described in more detail with reference to FIG. 7.

According to an embodiment, in the pre-fermentation process (S700), the controller 281A may measure a pressure of the fermentation tank 112 at a predetermined time interval by using the gas pressure sensor 72 and determine whether the pre-fermentation process (S700) is completed based on the measured pressure. This will be described in more detail with reference to FIG. 13.

The controller 281A may start the main-fermentation process (S800) when the pre-fermentation process (S700) is completed.

In the main-fermentation process (S800), the controller 281A may control the refrigerant cycle device 13 and the heater 14 so that the temperature measured by the temperature sensor 16 is maintained at a main-fermentation set temperature (for example, about 21° C.). Here, the main-fermentation target temperature may be less than the pre-fermentation target temperature.

According to an embodiment, the main-fermentation process (S800) may include a first main-fermentation process and a second main-fermentation process. The first main-fermentation process may correspond to a process in which alcohol is produced in the beverage being made, and the second main-fermentation process may correspond to a process in which carbonic acid is produced in the beverage being made.

The main-fermentation process (S800) will be described in more detail with reference to FIGS. 7 and 10 to 12.

The beverage making process may include an aging process (S900) in accordance with an embodiment of the invention.

In more detail, when the pre-fermentation process (S700) and the main-fermentation process (S800) are completed, the aging process (S900) may be performed.

In the aging process, the controller 281A may standby for an aging time and control the refrigerant cycle device 13 and the heater 14 so that a temperature of the beverage is maintained between an upper limit value and a lower limit value of a set aging temperature during the aging time.

Since the beverage maker is mainly used in an indoor space, an external temperature of the beverage maker may be maintained between the upper limit value and the lower limit value of the set aging temperature or have a temperature higher than the upper limit value of the set aging temperature. In this case, when the temperature detected by the temperature sensor 16 is less than the lower limit value of the set aging temperature, the controller 281A may turn off the compressor of the refrigerant cycle device 13, and when the temperature detected by the temperature sensor 16 is greater than the upper limit value of the set aging temperature, the controller 281A may turn on the compressor.

When the external temperature of the beverage maker is less than the lower limit value of the set aging temperature, the controller 281A may turn on the heater 14 when the temperature detected by the temperature sensor 16 is less than the lower limit value, and the controller 281A may turn off the heater 14 when the temperature detected by the temperature sensor 16 is greater than the upper limit value of the set aging temperature.

When the aging time elapses, the beverage making process using the beverage maker is complete.

However, in some cases, when the aging process (S900) may be omitted, and the main-fermentation process (S800) is completed, the making of the beverage may be completed. Thus, it is understood that the aging process (S900) may be omitted.

The controller 281A may display the completion of the making of the beverage through the display 282 to inform the user.

Also, the controller 281A may control the compressor 134 to maintain the temperature of the fermentation tank 112 to a temperature between an upper limit value and a lower limit value of a preset drinking temperature. When the temperature detected by the temperature sensor 16 is equal to or greater than the drinking temperature, the controller 281A may turn on the compressor of the refrigerant cycle device 13, and when the temperature detected by the temperature sensor 16 is equal to or less than the lower limit value of the drinking temperature, the controller 281A may turn off the compressor. Thus, the beverage maker may always provide cool beverage to the user.

The controller 281A may control the compressor to maintain the temperature of the fermentation tank 112 to the temperature between the upper limit value and the lower limit value of the preset drinking temperature until a beverage dispensing process (S1000) that will be described later is completed.

The beverage maker according to an embodiment may further include the beverage dispensing process (S1000) of dispensing the beverage after the beverage is made.

In the beverage dispensing process (S1000), the user may dispense the beverage by manipulating the dispenser 62.

After the beverage is completely made, when the user opens the dispenser 62, the controller 281A may open the main valve 40 and the beverage dispensing valve 64.

When the main valve 40 and the beverage dispensing valve 64 are opened, the beverage within the fermentation container 12 may flow from the fermentation container 12 to the second main channel 42 by the pressure of the air between the outer surface of the fermentation container 12 and the inner wall of the fermentation tank 112 and then flow from the second main channel 42 to the beverage dispensing channel 61 and be dispensed to the dispenser 62.

When the user closes the dispenser 62 after a portion of the beverage is dispensed through the dispenser 62, the controller 281A may close the main valve 40 and the beverage dispensing valve 64. Thus, the one-time beverage dispensing process may be completed.

Thereafter, the controller 281A may turn on the air pump 82 to open the air supply valve 159 and maintain the closing of the exhaust valve 156.

When the air pump 82 is turned on, the air injected into the air injection channel 81 may flow from the first main channel 41 to the air supply channel 154 and be supplied between the outer surface of the fermentation container 12 and the inner wall of the fermentation tank 112. The air between the outer surface of the fermentation container 12 and the inner wall of the fermentation tank 112 may press the fermentation container 12 at a pressure at which the beverage of the fermentation container 12 ascends to the second main channel 42. While the beverage is dispensed, a sufficiently high pressure may be maintained between the outer surface of the fermentation container 12 and the inner wall of the fermentation tank 112 so that the beverage is quickly dispensed.

The user may dispense the beverage at least one time through the dispenser 62. That is, the beverage dispensing process may be performed at least once, and the controller 281A may determine whether the beverage is completely dispensed by using information such as a time taken to open the dispenser 62, a time taken to drive the air pump 152, and a time taken to turn on the main valve 40 after the beverage is completely made.

When the beverage is completely dispensed, the controller 281A may close the air supply valve 159. Also, when the beverage is completely dispensed, and the dispenser 62 is closed, the controller 281A may open the exhaust valve 156 for a completion set time.

When the opening of the exhaust valve 156 is controlled, the air between the outer surface of the fermentation container 12 and the inner wall of the fermentation tank 112 may be exhausted to the exhaust valve 156 through the air supply channel 154 and the exhaust channel 157, and a pressure in the space between the outer surface of the fermentation container 12 and the inner wall of the fermentation tank 112 may be equal to atmospheric pressure.

When the completion set time elapses after the exhaust valve 156 is turned on, the controller 281A may close the exhaust valve 156.

When the cleaning process (S1100) is not performed after the beverage is completely dispensed, or the cleaning process (S1100) does not include a main channel washing process that will be described later, the controller 281A may display a pack removing message for informing removal of the fermentation container 12 on the display 282. The user may open the fermentation lid 107 to take the fermentation container 12 out of the fermentation tank module 111.

When the fermentation lid 107 is opened as described above, if the inside of the fermentation tank 112 has a high pressure that is greater by a set pressure than the atmospheric pressure, the fermentation container 12 may be bounded upward from the fermentation tank 112 by a pressure difference.

On the other hand, before the user opens the fermentation lid 107, when a portion of the air between the fermentation container and the fermentation tank 112 is exhausted through the exhaust valve 156, the fermentation container 12 may not bounded upward but be maintained in the fermentation tank 112.

That is, the user may more safely and cleanly take the used fermentation container 12 out of the fermentation tank 112.

The dispenser cleaning process may be performed after the beverage dispensing process is performed at least once.

When a large amount of time is required until the final beverage dispensing process is completed, and the next beverage dispensing process is performed, the inside of the dispenser channel (see reference numeral 611 of FIG. 5) may be contaminated by the beverage remaining in the dispenser 611.

Thus, when the user intends to dispense the beverage after a dispenser cleaning set time elapses while the final beverage dispensing process is performed, the controller 281A may perform the dispenser cleaning process.

In more detail, when the beverage dispensing process is completed, the controller 281A may drive a timer (not shown), and when the next beverage dispensing process starts, the timer may be reset. When the dispenser cleaning set time of the timer elapses, and the dispenser 62 is opened, the controller 281A may perform the dispenser cleaning process.

Also, the controller 281A may receive a dispenser cleaning command from the input unit or the mobile terminal to perform the dispenser cleaning process.

When the dispenser cleaning process starts, the controller 281A may display cleaning notification on the display 282. The cleaning notification may include a notification to the user of the dispenser 82 not to bring a cup or a glass.

An example of the dispenser cleaning process may include a water washing process and an air washing process.

When the water washing process is performed, the controller 281A may turn on the water supply pump 52. Also, the controller 281A may open the sub valve 92 and the beverage dispensing valve 64 and maintain the closing of the ingredient supply valve 310 and the bypass valve 35.

When the water pump 52 is turned on, the water suctioned from the water tank 51 to the water supply pump 52 may flow from the water supply channel 55B to the sub channel 91 and then pass through the sub valve 92 to flow to the beverage dispensing channel 61, pass through the beverage dispensing valve and be dispensed to the dispenser 62. While the water is dispensed to the dispenser 62, the residue and foreign substances in the dispenser channel 611 may be dispensed together with each other to perform the cleaning.

The water and the foreign substances dispensed to the dispenser 62 may drop down to the beverage container (see reference numeral 101 of FIG. 3) or into a separate container placed below the dispenser 62.

When the water washing process starts, and an amount of accumulated water detected by the flow meter 56 reaches a water washing set flow rate, the water washing process may be completed. Here, the water washing set flow rate may be less than a cleaning set flow rate during the cleaning processes (S100 and S1100).

When the water washing process is completed, the controller 281A may turn off the water supply pump. Also, when the water washing process is completed, the controller 281A may start the air washing process.

When the air washing process starts, the controller 281A may turn on the air pump 82.

When the air pump 82 is turned on, the air injected from the air pump 82 into the air main channel 41 through the air injection channel 81 may pass through the water supply heater 53 to flow to the sub channel 91 and then pass through the sub valve 92 to flow to the beverage dispensing channel 61, pass through the beverage dispensing valve 64, and be discharged to the dispenser 62. While the air is dispensed to the dispenser 62, the residual water remaining in the dispenser channel 611 may be dispensed together to perform the cleaning. Thus, an effect of the residual water on the taste of the beverage in the subsequent beverage dispensing process may be minimized.

When the air washing process starts, and an air washing set time elapses, the controller 281A may complete the air washing process. When the air washing process is completed, the controller 281A may turn off the air pump 82 and close the sub valve 92. Thus, the dispenser cleaning process may be completed.

When the dispenser cleaning process is completed, the controller 281A may start the beverage dispensing process again.

When the beverage of the fermentation container 12 is completely dispensed, and thus, the controller 281A determines that the beverage dispensing is completed, the controller 281A may further perform the beverage making process and the cleaning process (S1100) after the beverage dispensing.

The beverage making process and the cleaning process (S1100) after the beverage dispensing may include at least one of a first cleaning process and a second cleaning process. When the cleaning process (S1100) includes the first cleaning process and the second cleaning process, this embodiment is not limited to an order of the cleaning processes.

Since the first cleaning process is equal to or similar to the above-described cleaning process (S100) before the beverage making process (S100), duplicated descriptions will be omitted herein. Hereinafter, the second cleaning process will be described.

The second cleaning process may be performed in the state in which the beverage dispensing is completed, and the empty fermentation container 12 is mounted or performed after the user removes the empty fermentation container 12 to mount a separate cleaning pack on the fermentation tank 112. Hereinafter, for convenience of description, a case in which the separate cleaning pack is accommodated in the fermentation tank 112 will be described.

When the beverage of the fermentation container is completely dispensed, the controller 281A may display a replacement notification on the display 282. The user may open the fermentation lid to remove the empty fermentation container from the fermentation tank 112 and insert the separate cleaning pack into the fermentation tank 112. Thereafter, the fermentation lid 107 may be closed.

Thereafter, the controller 281A may perform the second cleaning process.

When the second cleaning process starts, the controller 281A may turn off the water supply pump 52 and the water supply heater 53 and close the beverage dispensing valve.

Also, the controller 281A may turn off the ingredient supply valve 310, the bypass valve 35, and the main valve 40.

Also, when the second cleaning process starts, the controller 281A may open the gas discharge valve 73 and the exhaust valve 156. Also, the controller 281A may open the sub valve 92.

When the water supply pump 52 is turned on, water of the water tank 51 may flow to the water supply heater 53 and then be heated in the water supply heater 53.

The water heated by the water supply heater 53 may flow to be divided into the sub channel 91 and the first main channel 41.

The water flowing to the sub channel 91 may pass through the sub valve 92 to flow to the beverage dispensing channel 61. The water flowing to the beverage dispensing channel 61 may flow to the second main channel 42 to pass through the main valve 40 and then be introduced into the cleaning pack accommodated in the fermentation tank 112.

Also, the water flowing to the first main channel 41 may flow to be divided into the ingredient supply module 3 and the bypass channel 43.

The water flowing to the ingredient supply module 3 may sequentially pass through the ingredient supply valve 310, the initial capsule mounting part 31, the intermediate capsule mounting part 32, and the final capsule mounting part 33 to flow to the second main channel 42 and then pass through the main valve 40 and be introduced into the cleaning pack accommodated in the fermentation tank 112.

The water flowing to the bypass channel 43 may pass through the bypass valve 35 to flow to the second main channel 42 and then pass through the main valve 40 and be introduced into the cleaning pack accommodated in the fermentation tank 112.

When controlled as described above, the main channels 41 and 42, the bypass channel 43, the sub channel 91, the valves installed in the channels, and the main channel connecting portion 115 may be sterilized and washed. Also, the capsule mounting parts 31, 32, and 33, and the connecting channels 311 and 312 may be sterilized and washed.

The controller 281A may perform the cleaning during a second cleaning set time. After the second cleaning set time, the second cleaning process may be completed.

When the second cleaning set time elapses, the controller 281A may turn off the water supply pump 52 and the water supply heater 53 to close all of the main valve 40, the bypass valve 35, the ingredient supply valve 310, the sub valve 92, the gas discharge valve 73, and the exhaust valve 156.

After the cleaning process (S1100) is completed, the user may open the fermentation lid 107 and remove the cleaning pack containing the water used for washing the fermentation tank 112.

Figure 7:
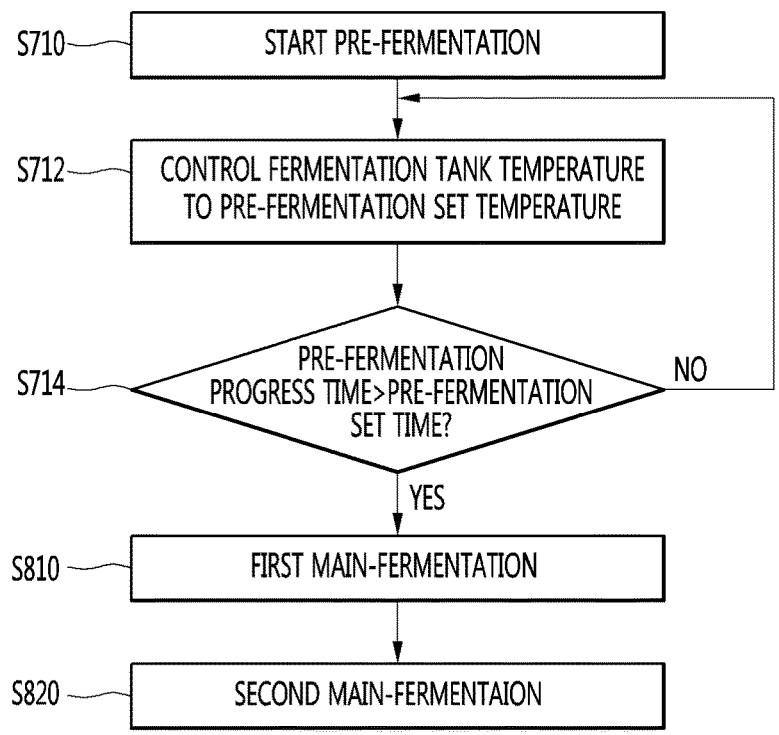
FIG. 7 is a flowchart illustrating a specific example of a fermentation process in the beverage maker of FIG. 6 according to an embodiment of the present invention.

FIG. 7 is a flowchart explaining a specific example of the fermentation process in the beverage maker of FIG. 6, and FIGS. 8 to 11 are views for explaining an operation of the beverage maker of FIG. 7. FIG. 12 is a graph illustrating an example of a variation in temperature of the fermentation tank and pressure of fermentation in processes of the fermentation process of FIG. 7.

Referring to FIG. 7, when the ingredient supplier residual water removing process (S600) (see FIG. 6) is completed, the controller 281A may start the pre-fermentation process (S710).

Specifically, the controller 281A may start the pre-fermentation process when yeast is added to the beverage being made in the fermentation module 1.

The controller 281A may measure the pre-fermentation progress time using the timer 285 according to the start of the pre-fermentation process.

As the pre-fermentation process starts, the controller 281A may control the temperature controller 11 to control a fermentation tank temperature to the pre-fermentation set temperature (S712).

The controller 281A may periodically or continuously detect the fermentation tank temperature through the temperature sensor 16 and control the refrigerant cycle device 13 or the heater 14 of the temperature controller 11 on the basis of the detected temperature of the fermentation tank 112.

For example, when the pre-fermentation set temperature is about 30° C., and a margin value is about 0.5° C., an upper limit value of the pre-fermentation set temperature may be about 30.5° C., and a lower limit value may be about 29.5° C. The controller 281A may drive the heater 14 to raise the temperature of the fermentation tank 112 when the detected temperature of the fermentation tank 112 is less than the lower limit value of the pre-fermentation set temperature. The controller 281A may drive the refrigerant cycle device 13 to lower the temperature of the fermentation tank 112 when the detected temperature of the fermentation tank 112 is greater than the lower limit value of the pre-fermentation set temperature. That is, the controller 281A may maintain the temperature of the fermentation tank 112 between the lower limit value and the upper limit value of the pre-fermentation set temperature in the pre-fermentation process (S700), thereby enabling the effective activation of the yeast.

The operation S712 of FIG. 7 may be continuously performed while the pre-fermentation process (S700) is performed.

Figure 8:
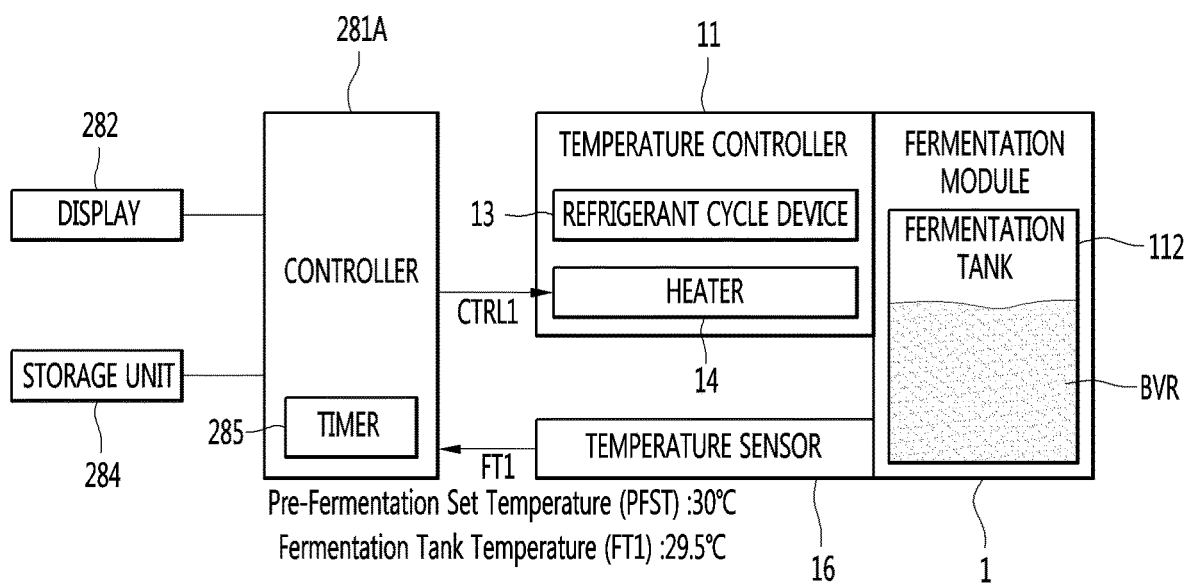
FIG. 8 is a block diagram of an operation of the beverage maker of FIG. 7 according to an embodiment of the present invention.

In the operation S12 of FIG. 8, the controller 281A may detect the fermentation tank temperature FT1 using the temperature sensor 16. If the detected fermentation tank temperature FT1 is about 29.5° C., the controller 281A may output a first control signal CTRL1 for driving the heater 14 to raise the fermentation tank temperature. The heater 14 may be driven in response to the first control signal CTRL1. As the heater 14 is driven, the fermentation tank temperature may gradually increase.

Figure 9:
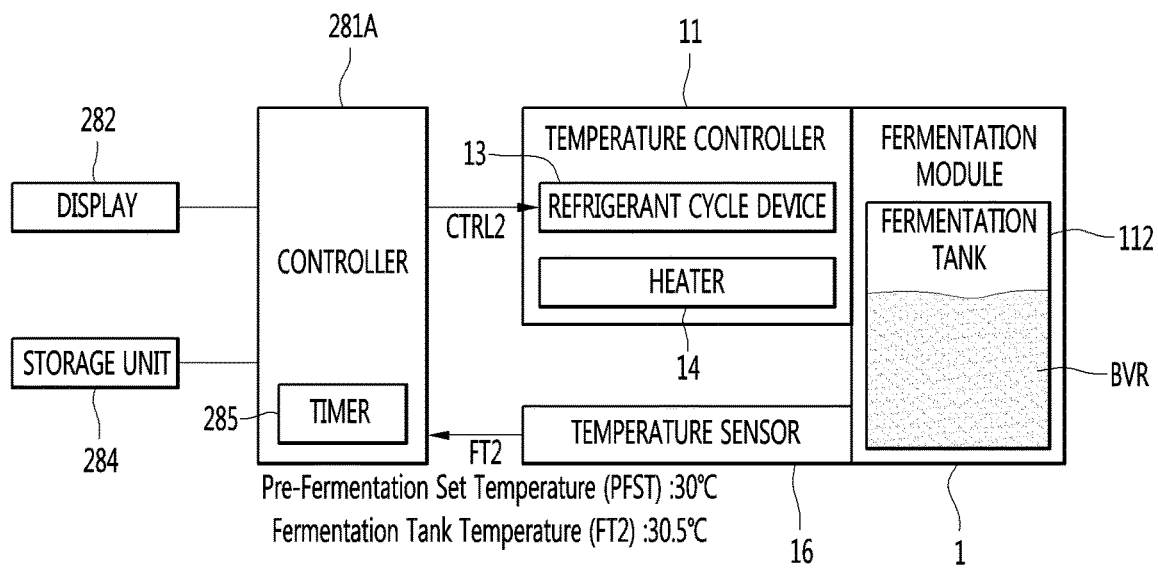
FIG. 9 is a another block diagram of an operation of the beverage maker of FIG. 7 according to an embodiment of the present invention.

Also, as illustrated in FIG. 9, if the detected fermentation tank temperature FT2 is about 30.5° C., the controller 281A may output a second control signal CTRL2 for driving the refrigerant cycle device 13 to raise the fermentation tank temperature. The refrigerant cycle device 13 may be driven in response to the second control signal CTRL2. Here, while the heater 14 is driven, the controller 281A may further output a control signal for stopping the driving of the heater 14. As the refrigerant cycle device 13 is driven, the fermentation tank temperature may gradually decrease.

Although not shown, the controller 281A may open the gas discharge valve 73 during the pre-fermentation process (S700). As the gas discharge valve 73 is opened, the fermentation tank pressure during the pre-fermentation process (S700) may be equal to the atmospheric pressure (0 bar).

Also, according to an embodiment, the controller 281A may display the pre-fermentation progress time, the fermentation tank temperature, or the pre-fermentation set temperature through the display 282.

The controller 281A may compare the pre-fermentation progress time measured by the timer 285 with the pre-fermentation set time (S714). As a result of the comparison, if the pre-fermentation progress time exceeds the pre-fermentation set time (YES in operation S714), the controller 281A may end the pre-fermentation process.

The controller 281A may end the pre-fermentation process (S700) and sequentially perform the first main-fermentation process (S810) and the second main-fermentation process (S820).

Figure 10:
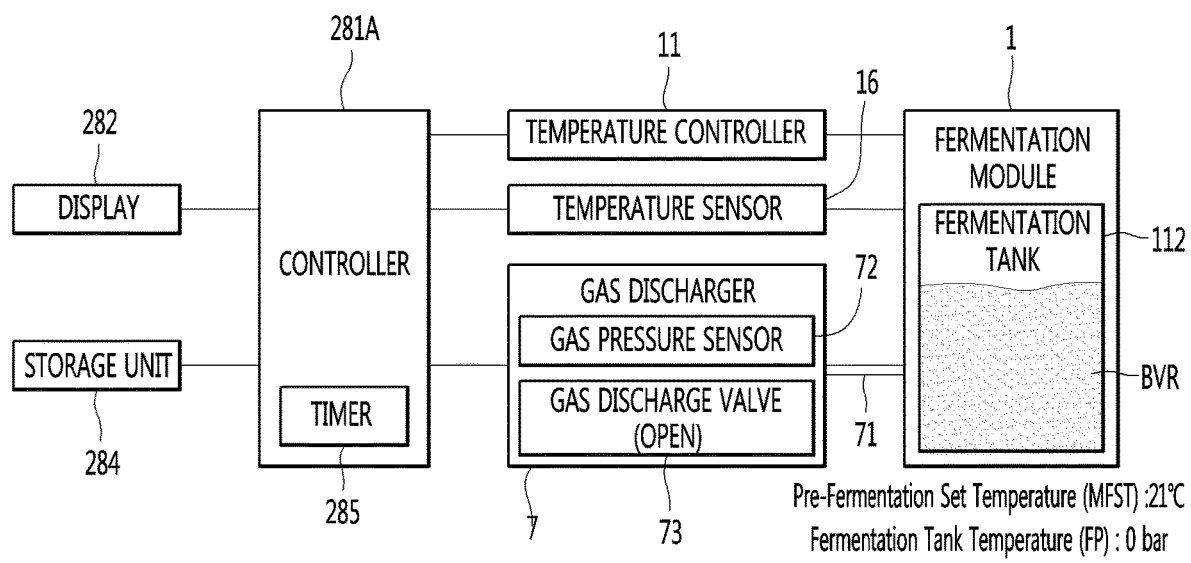
FIG. 10 is yet another block diagram of an operation of the beverage maker of FIG. 7 according to an embodiment of the present invention.

Referring to FIG. 10, the controller 281A may control the temperature controller 11 to control the fermentation tank temperature to the main-fermentation set temperature MFST to perform the first main-fermentation process (S810). The main-fermentation set temperature MFST may be less than the pre-fermentation set temperature PFST (e.g., about 21° C.), but it may be the same in some cases. In the pre-fermentation process, similar to the above, the controller 281A may maintain the fermentation tank temperature between the lower limit value (e.g., 20.5° C.) and the upper limit value (e.g., 21.5° C.) of the main-fermentation set temperature MFST. Thus, the beverage BVR being made may be more effectively fermented.

Also, in the first main-fermentation process (S810), the controller 281A may maintain the gas discharge valve 73 in the opened state. Thus, the fermentation tank pressure FP measured by the gas pressure sensor 72 may correspond to 0 bar.

The yeast activated in the pre-fermentation process (S700) may decompose sugar in the beverage BVR to produce alcohol (ethanol) and carbon dioxide in the first main-fermentation process (S810). In the first main-fermentation process (S810), since the gas discharge valve 73 is in opened state, the generated carbon dioxide may be discharged to the outside through the gas discharge channel 71.

According to an embodiment, the controller 281A may display information on the first main-fermentation process progress time, the fermentation tank temperature, the main-fermentation set temperature, or the fermentation tank pressure through the display 282.

The controller 281A may end the first main-fermentation process (S810) and perform the second main-fermentation process (S820) when the first main-fermentation process set time elapses. According to an embodiment, the controller 281A may repeat the opening and closing of the gas discharge valve 73 when the first main-fermentation process progress time exceeds a predetermined time.

When the gas discharge valve 73 is opened after being closed, the controller 281A may measure the pressure of the fermentation tank by using the gas pressure sensor 72. When the measured fermentation tank pressure reaches the first main fermentation set pressure, the first main-fermentation process may be completed. That is, in the first main-fermentation process (S810), the opened time of the gas discharge valve 73 may be longer than the closed time.

Figure 11:
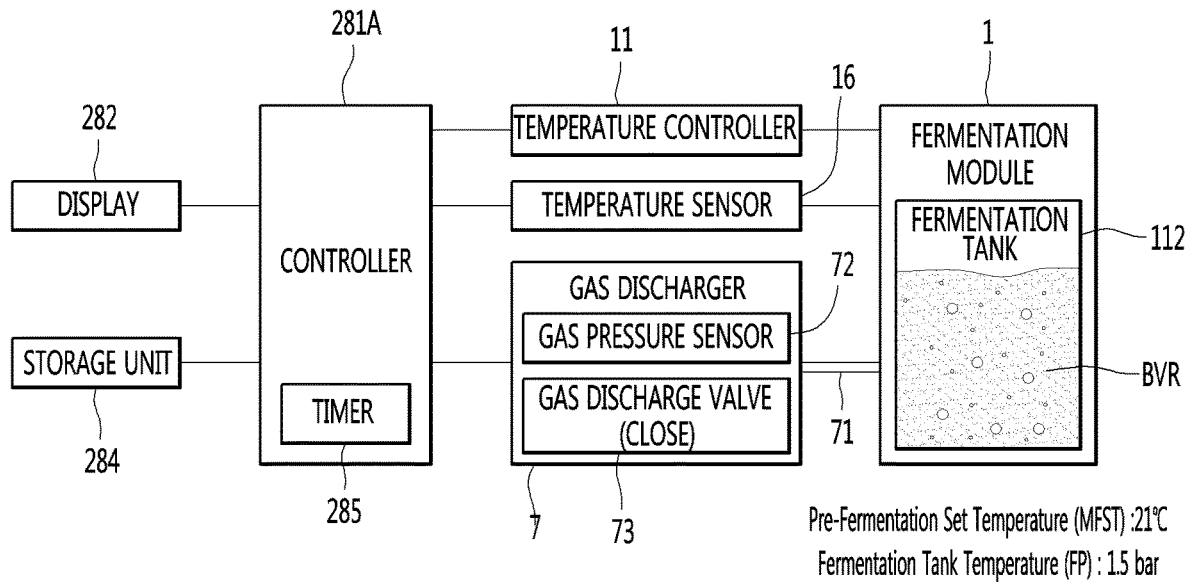
FIG. 11 is still yet another block diagram of an operation of the beverage maker of FIG. 7 according to an embodiment of the present invention.
Figure 12:
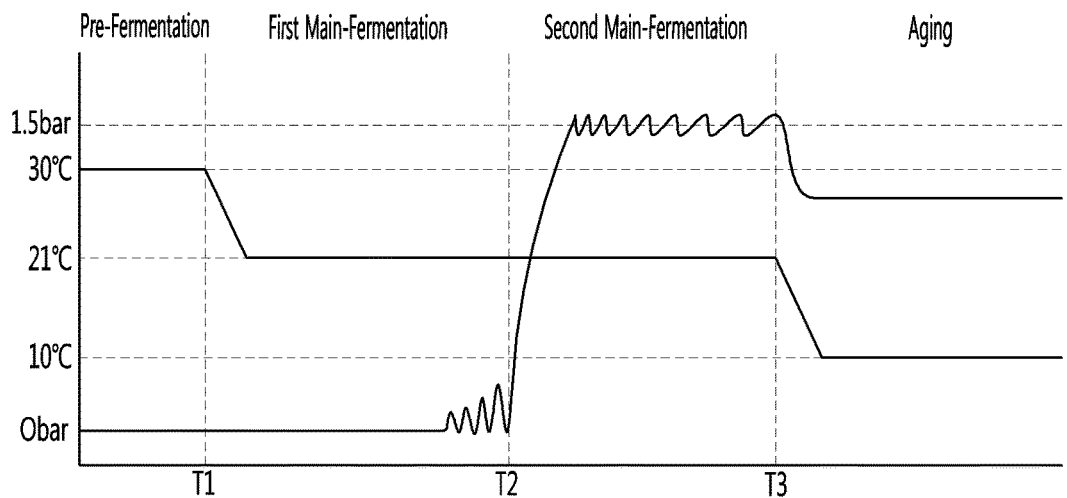
FIG. 12 is a graph illustrating an example of a variation in temperature of a fermentation tank and pressure of fermentation in processes of the fermentation process of FIG. 7 according to an embodiment of the present invention.

Referring to FIG. 11, as the second main-fermentation process (S800) is performed, the controller 281A may close the gas discharge valve 73. Also, like the first main-fermentation process (S810), the controller 281A may control the temperature controller 11 to control the fermentation tank temperature to the main-fermentation set temperature MFST.

In the second main-fermentation process, the yeast may produce carbon dioxide from the residual sugar in the beverage BVR. According to an embodiment, the yeast may further produce an alcohol from the residual sugar. Since the gas discharge valve 73 is in the closed state, the produced carbon dioxide may be dissolved in the beverage BVR in the form of carbonic acid without being discharged to the outside.

If the pressure in the fermentation tank excessively increases as the carbon dioxide is continuously produced, the fermentation tank 112 and the fermentation module 1 may be damaged. Thus, the controller 281A may control the fermentation tank pressure FP to a second main-fermentation set pressure (e.g., about 1.5 bar). That is, the pressure in the fermentation tank 112 may be higher than in the second main-fermentation process compared to the first main-fermentation process.

Specifically, in connection with the control of the fermentation tank pressure FP, the controller 281A may measure the fermentation tank pressure FP using the gas pressure sensor at predetermined time intervals. When the measured fermentation tank pressure FP is greater than the upper limit value of the second main-fermentation set pressure, the controller 281A may open the gas discharge valve 73 to discharge the carbon dioxide in the fermentation tank 112 to the outside.

The controller 281A may continuously measure the fermentation tank pressure FP during the discharge of the carbon dioxide and close the gas discharge valve 73 when the measured fermentation tank pressure FP is less than the lower limit value of the second main-fermentation set pressure. In the case of the second main-fermentation process (S820), a time at which the gas discharge valve 73 is closed may be greater than the opened time.

According to an embodiment, as illustrated in FIG. 2, when the beverage maker further includes a pressure release valve 76 provided with a noise reduction device 77, the controller 281A may control the pressure release valve 76 in place of the gas discharge valve 73 in the second main-fermentation process (S820) to open/close the pressure release valve 76, and the gas discharge valve 73 may be maintained in the closed state.

The controller 281A may end the second main-fermentation process (S820) when the second main-fermentation process progress time reaches the second main-fermentation process set time.

According to an embodiment, as the second main-fermentation process (S820) is continuously performed, an amount of carbon dioxide produced per unit time may gradually decrease. Thus, a variation in amount per unit time of the fermentation tank pressure measured by the gas pressure sensor 72 may gradually decrease, and the controller 281A may end the second main-fermentation process (S820) when the variation in amount per unit time of the fermentation tank pressure becomes lower than the reference change amount.

Referring to FIG. 12, the fermentation tank temperature and the fermentation tank pressure may be changed based on the set temperatures and/or set pressures of the pre-fermentation process (S700), the first main-fermentation process (S810), and the second main-fermentation process (S820).

For example, when the pre-fermentation set temperature in the pre-fermentation state (S700) is about 30° C., the fermentation tank temperature may be maintained at a temperature of about 30° C. or in the range between the lower limit value and the upper limit value of the pre-fermentation set temperature.

For example, the fermentation tank temperature may be lowered to about 21° C. which is the main-fermentation set temperature as the first main-fermentation process (S700) is completed, and the first main-fermentation process (S810) may be performed at a first time point T1. Thereafter, the fermentation tank may maintain the fermentation tank temperature at about 21° C. or maintain the range between the lower limit value and the upper limit value of the main-fermentation set temperature up to a third time point T3 at which the second main-fermentation process (S820) is ended.

When the second main-fermentation process (S820) is completed at the third time point T3, the fermentation tank temperature may be lowered to the aging set temperature (for example, about 10° C.)

Since the gas discharge valve 73 is opened in the pre-fermentation process (S700) and the first main-fermentation process (S810), the pressure of the fermentation tank may correspond to 0 bar.

According to an embodiment, during the second half of the first main-fermentation process (S810), the gas discharge valve (73) may be periodically opened and closed to measure the variation in fermentation tank pressure, and the fermentation tank pressure when the gas discharge valve 73 is closed.

As the second main-fermentation process (S820) is performed at the second time point T2, the gas discharge valve 73 may be closed, and the fermentation tank pressure may increase by the carbon dioxide.

In the second main-fermentation process (S820), the fermentation tank pressure may be maintained at a set pressure of approximately 1.5 bar, or a range between the lower limit value and the upper limit value of the set pressure. For this, the gas discharge valve 73 may be opened and closed a plurality of times, and the pressure of the fermentation tank when the gas discharge valve 73 is opened may be reduced.

When the second main-fermentation process (S820) is completed at the third time point T3, the fermentation tank pressure may be controlled to the aging set pressure.

That is, in the beverage maker according to an embodiment, since the fermentation tank temperature and the fermentation tank pressure are adjusted to an optimal or sufficient set temperature and set pressure for each of the fermentation processes, the fermentation process for the beverage being made may be performed more effectively. As a result, the quality (taste and flavor, etc.) of the made beverage may be maximized, and the satisfaction of the user may also be improved.

Particularly, the beverage maker may perform the pre-fermentation process for promoting the activation of the yeast to be put in the form of powder, and thus. the main-fermentation may be progressed more smoothly.

Figure 13:
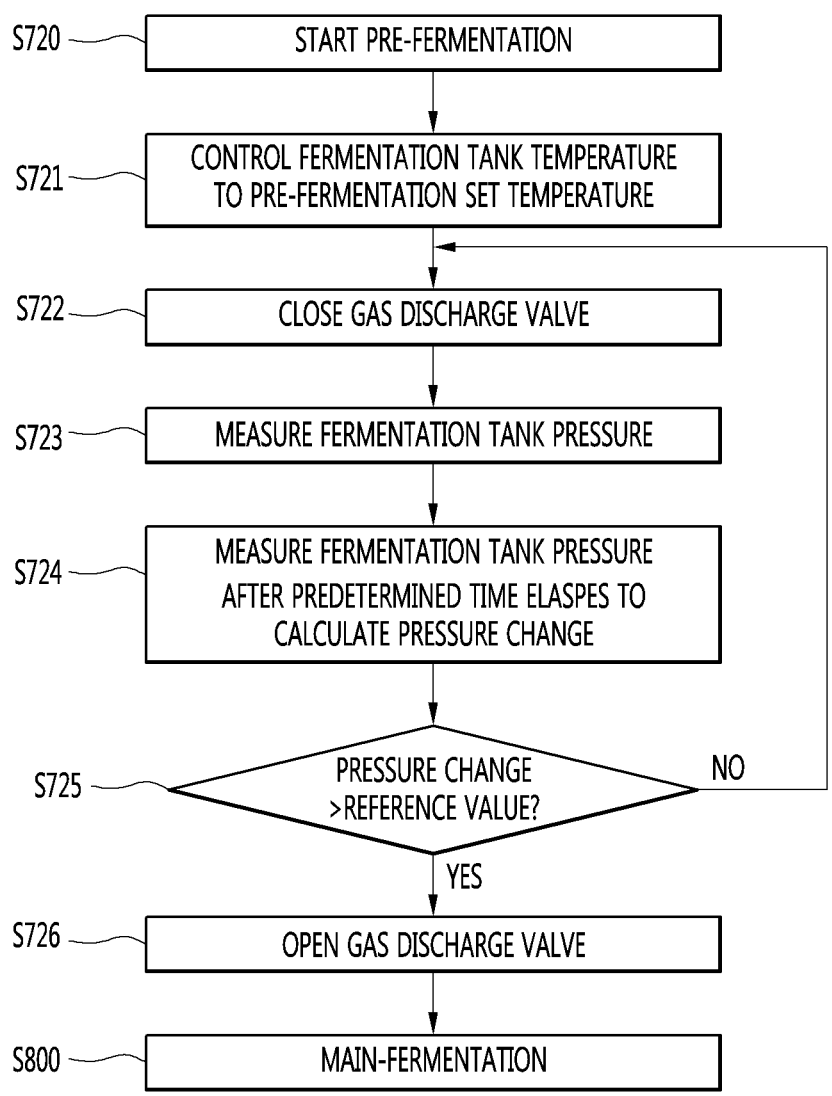
FIG. 13 is a flowchart illustrating a specific example of the fermentation process in the beverage maker of FIG. 6 according to an embodiment of the present invention.

FIG. 13 is a flowchart for explaining a specific example of the fermentation process in the beverage maker of FIG. 6 according to an embodiment of the present invention.

Referring to FIG. 13, when the ingredient supplier residual water removing process (S600) (see FIG. 6) is completed, the controller 281A may start the pre-fermentation process (S720).

As the pre-fermentation process starts, the controller 281A may control the temperature controller 11 to control a fermentation tank temperature to the pre-fermentation set temperature (S721).

The operation (S721) is substantially the same as the operation (S712) of FIG. 7; therefore, a detailed description thereof will be omitted.

The controller 281A may close the gas discharge valve 73 (S722).

The controller 281A may close the gas discharge valve 73 for a predetermined time. In this case, if the yeast inside the fermentation tank 112 is sufficiently activated, the pressure of the fermentation tank may increase. If most of the yeast is still inactivated, the pressure of the fermentation tank may hardly increase.

The controller 281A may measure the pressure of the fermentation tank at predetermined time intervals (S723 and S724). For this, the controller 281A may instantaneously open and close the gas discharge valve 73 and measure the pressure of the fermentation tank by using the gas pressure sensor 72 when the gas discharge valve 73 is opened.

The controller 281A may calculate the variation in pressure based on the measurement result (S724) and compare the variation in calculated pressure with the reference value (S725).

As a result of the comparison, when the pressure change is less than or equal to the reference value (NO in operation S725), the controller 281A may perform operations S722 to S724 again. That is, when the pressure change is less than the reference value, it may be determined by the controller that most of the yeast is still inactivated.

On the other hand, when the pressure change is greater than the reference value (YES in operation S725), the controller 281A may stop or end the pre-fermentation process. That is, if the pressure change is greater than the reference value, it may be determined by the controller that the yeast is sufficiently activated.

As the pre-fermentation process is completed, the controller 281A may open the gas discharge valve 73 (S726) and perform the main-fermentation process (S800).

That is, according to embodiment of FIG. 13, since the beverage maker may confirm a degree of activation of the yeast inside the fermentation tank 112, the pre-fermentation process may be performed more effectively.

Figure 14:
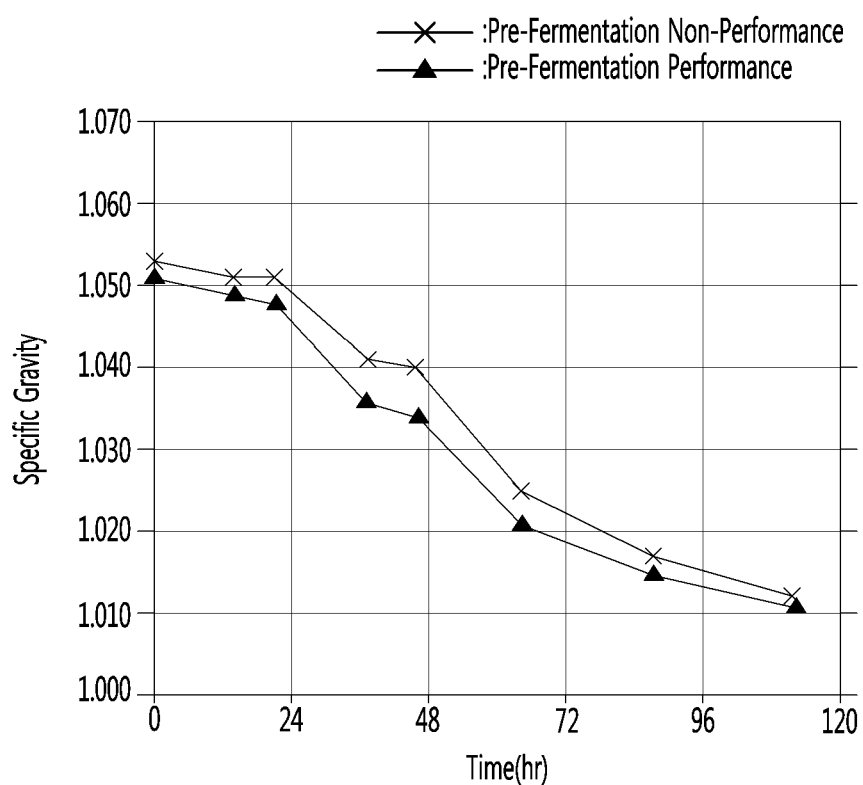
FIG. 14 is a graph that illustrates the effects of performing the pre-fermentation process described in FIGS. 7 to 13.
Figure 15:
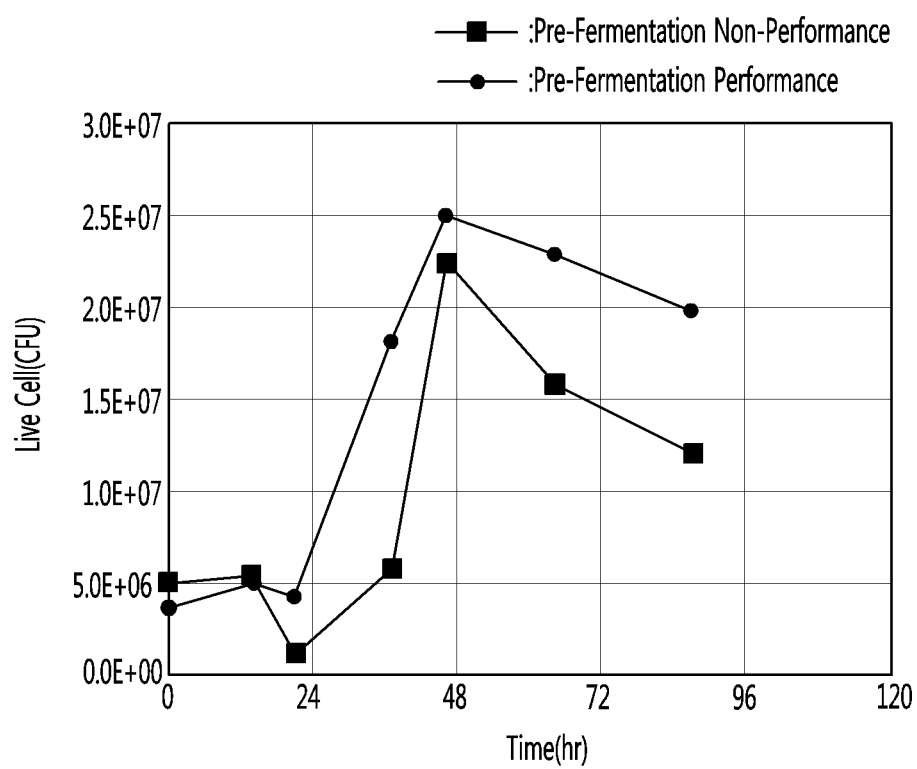
FIG. 15 is another graph that illustrates the effects of performing the pre-fermentation process described in FIGS. 7 to 13.

FIGS. 14 and 15 are graph for comparing and explaining effects of performing the pre-fermentation process described in FIGS. 7 to 13.

As the fermentation process of the above-mentioned beverage is more effectively performed, the sugar content in the beverage may be effectively decomposed, so that the specific gravity of the beverage may be more quickly reduced. To effectively perform the beverage fermentation process, a large amount of yeast must be activated inside the fermentation tank 112.

Thus, referring to FIGS. 14 and 15, it is confirmed that a rate of decrease of specific gravity is faster when the pre-fermentation process is performed as compared to the case of not performing the main-fermentation process. Also, it is confirmed that the amount of activated yeast is higher when the pre-fermentation process is performed.

Particularly, it is confirmed that the difference between the amount of activated yeast when performing the pre-fermentation process and the amount of activated yeast when the pre-fermentation process is not performed is maximized in a time period of about 24 hours to about 36 hours. Thus, the difference in specific gravity of the beverage may be maximized in the above time period.

That is, as the pre-fermentation process is performed, the fermentation of the beverage is more effectively performed, and as a result, the quality (taste or flavor, etc.) of the beverage being made may be improved.

According to the embodiments disclosed herein, the beverage maker may perform the pre-fermentation process of controlling the temperature of the fermentation tank to the temperature that promotes the activation of the yeast before the fermentation process so that fermentation of the beverage is effectively performed in the subsequent fermentation process. As the beverage is effectively fermented, the quality of the taste and flavor of the produced beverage may be improved, and the satisfaction of the user may also be enhanced.

Also, the beverage maker may automatically performs the pre-fermentation process, the main fermentation process, and other beverage production processes, thereby making it unnecessary for the user to operate or attend to the beverage maker during the production of the beverage, so that the user's convenience may be improved.

The above-disclosed subject matter is to be considered illustrative, and not restrictive, and the appended claims are intended to cover all such modifications, enhancements, and other embodiments, which fall within the true spirit and scope of the present disclosure.

Thus, the embodiments of the present disclosure are to be considered illustrative, and not restrictive, and the technical spirit of the present disclosure is not limited to the foregoing embodiment.

Therefore, the scope of the present disclosure is defined not by the detailed description of the invention but by the appended claims, and all differences within the scope will be construed as being included in the present disclosure.

What is claimed is:

1. A beverage maker apparatus comprising:
   a fermentation tank having a space formed therein in which a beverage is made;
   a temperature sensor configured to detect a temperature of the fermentation tank;
   a temperature controller configured to control the temperature of the fermentation tank;
   a gas discharger configured to control a pressure within the fermentation tank, wherein the gas discharger comprises:
   a gas pressure sensor configured to measure the pressure within the fermentation tank, and
   a gas discharge valve configured to open and close a gas discharge channel connected to the fermentation tank; and
   a controller configured to control a fermentation process when yeast is added to the beverage that is being made in the fermentation tank, the fermentation process comprising:
   a pre-fermentation process of controlling the temperature controller on the basis of a first set temperature, and a main-fermentation process of controlling the temperature controller on the basis of a second set temperature,
   wherein the pre-fermentation process includes a process for activating yeast added to the fermentation container,
   wherein the fermentation process includes a process in which alcohol and carbonic acid are formed by the activated yeast, and
   wherein the controller is further configured to close the gas discharge valve and control the gas discharge valve based on a degree of activation of the yeast,
   wherein the gas discharger further comprises:
   a safety valve connected to the gas discharge channel,
   a pressure release valve connected to the gas discharge channel, and
   a noise reducing device mounted on the pressure release valve.

2. The beverage maker apparatus of claim 1, wherein the first set temperature is greater than the second set temperature.

3. The beverage maker apparatus of claim 1, wherein the controller comprises a timer configured to measure a pre-fermentation progress time when the pre-fermentation process is performed, and
   when the pre-fermentation progress time is greater than a pre-fermentation set time, the main-fermentation process is performed.

4. The beverage maker apparatus of claim 1, wherein the temperature controller comprises:
   a heater for increasing the temperature of the fermentation tank; and a refrigerant cycle device for decreasing the temperature of the fermentation tank.

5. The beverage maker apparatus of claim 4, wherein, in the pre-fermentation process,
the controller is configured to drive the heater when the temperature of the fermentation tank, which is detected through the temperature sensor, is below a lower limit value of the first set temperature, and
the controller is configured to drive the refrigerant cycle device when the temperature of the fermentation tank is above an upper limit value of the first set temperature.

6. The beverage maker apparatus of claim 4, wherein, in the main-fermentation process, the controller is configured to drive the heater when the temperature of the fermentation tank, which is detected through the temperature sensor, is below a lower limit value of the second set temperature, and
the controller is configured to drive the refrigerant cycle device when the temperature of the fermentation tank is above an upper limit value of the second set temperature.

7. The beverage maker apparatus of claim 1, wherein, in the pre-fermentation process, the controller is configured to open the gas discharge valve.

8. The beverage maker apparatus of claim 1, wherein the main-fermentation process comprises a first main-fermentation process and a second main-fermentation process,
whereby a pressure within the fermentation tank in the second main-fermentation process is maintained to be greater than a pressure within the fermentation tank in the first main-fermentation process.

9. The beverage maker apparatus of claim 8, wherein the gas discharge valve is in an opened state when the first main-fermentation process is performed, and
the controller is configured to repeatedly perform opening and closing operations of the gas discharge valve when a progress time of the first main-fermentation process is greater than a predetermined time, measure a pressure within the fermentation tank by using the gas pressure sensor when the gas discharge valve is opened, and perform the second main-fermentation process when the measured pressure is at a first main-fermentation set pressure.

10. The beverage maker apparatus of claim 9, wherein the controller is configured to close the gas discharge valve when the second main-fermentation process is performed, measure a pressure within the fermentation tank by using the gas pressure sensor, open the gas discharge valve when the measured pressure is greater than an upper limit value of a second main-fermentation set pressure, and close the gas discharge valve when the measured pressure is less than a lower limit value of the second main-fermentation set pressure.

11. The beverage maker according to claim 10, wherein the controller operates to end the second main-fermentation process when a variation in pressure within the fermentation tank, which is measured by the gas pressure sensor, per unit time is less than a reference variation.

12. The beverage maker apparatus of claim 1, wherein, in the pre-fermentation process, the controller is configured to close the gas discharge valve, measure the pressure within the fermentation tank by using the gas pressure sensor, calculate a variation in pressure by measuring the pressure within the fermentation tank after a predetermined time elapses, and end the pre-fermentation process when the calculated pressure variation is greater than a reference value.

13. The beverage maker apparatus of claim 1, further comprising:
a water supply module configured to supply water to the fermentation tank; and
an ingredient feeder disposed between the water supply module and the fermentation tank to accommodate the yeast.

* * * * *